US012488184B1

(12) United States Patent
Sun et al.

(10) Patent No.: US 12,488,184 B1
(45) Date of Patent: Dec. 2, 2025

(54) ALTERNATIVE INPUT REPRESENTATIONS

(71) Applicant: Amazon Technologies, Inc., Seattle, WA (US)

(72) Inventors: Zhongkai Sun, Bellevue, WA (US); Sixing Lu, Bellevue, WA (US); Chengyuan Ma, Bellevue, WA (US); Xiaohu Liu, Bellevue, WA (US); Chenlei Guo, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 708 days.

(21) Appl. No.: 17/708,639

(22) Filed: Mar. 30, 2022

Related U.S. Application Data

(60) Provisional application No. 63/309,738, filed on Feb. 14, 2022.

(51) Int. Cl.
  *G06F 40/295* (2020.01)
  *G06F 40/284* (2020.01)
  *G06N 5/022* (2023.01)
  *G10L 15/26* (2006.01)

(52) U.S. Cl.
  CPC ......... *G06F 40/295* (2020.01); *G06F 40/284* (2020.01); *G06N 5/022* (2013.01); *G10L 15/26* (2013.01)

(58) Field of Classification Search
  CPC ..... G06F 40/295; G06F 40/284; G06N 5/022; G10L 15/26
  See application file for complete search history.

(56) References Cited

U.S. PATENT DOCUMENTS

| | | | |
|---|---|---|---|
| 11,011,160 B1* | 5/2021 | Villaizan | G10L 15/1815 |
| 11,482,223 B2* | 10/2022 | Dua | G06F 40/20 |
| 2014/0316764 A1* | 10/2014 | Ayan | H04M 3/4936 704/9 |
| 2017/0206241 A1* | 7/2017 | Beller | G06F 40/284 |
| 2022/0277738 A1* | 9/2022 | Aher | G06N 20/00 |

* cited by examiner

*Primary Examiner* — Sonia L Gay
(74) *Attorney, Agent, or Firm* — Pierce Atwood LLP

(57) ABSTRACT

Techniques for determining alternative input representations using entity expansion and entity weighting are described. An entity expansion knowledge base is built by extracting entities from user input-system response pairs that resulted in satisfactory experiences. An extracted entity is associated with an initial score based on it being included in the user input only, in the system response only or both the user input and the system response. Entities co-occurring in the user input-system response pair are connected in the knowledge base. An overall score is associated with the connections based on the initial scores of the connected entities. Using the knowledge base, expansion entities related to an entity included in a user input are determined, and the expansion entities and user input entity are weighted. The weighting of the entities involves assigning a level to each entity based on pairs of user input-alternative input representation.

18 Claims, 10 Drawing Sheets

ALTERNATIVE INPUT REPRESENTATIONS

CROSS REFERENCE TO RELATED APPLICATION

This application claims the benefit of priority of U.S. Provisional Patent Application No. 63/309,738 filed Feb. 14, 2022 and titled "UTTERANCE CORRECTION," in the names of Zhongkai Sun, et al., the content of which is expressly incorporated herein by reference in its entirety.

BACKGROUND

Natural language processing systems have progressed to the point where humans can interact with and control computing devices using their voices. Such systems employ techniques to identify the words spoken by a user based on the various qualities of received input data. Speech recognition combined with natural language understanding processing techniques enable speech-based user control of computing devices to perform tasks based on the spoken inputs. Speech recognition and natural language understanding processing techniques are sometimes referred to collectively or separately as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
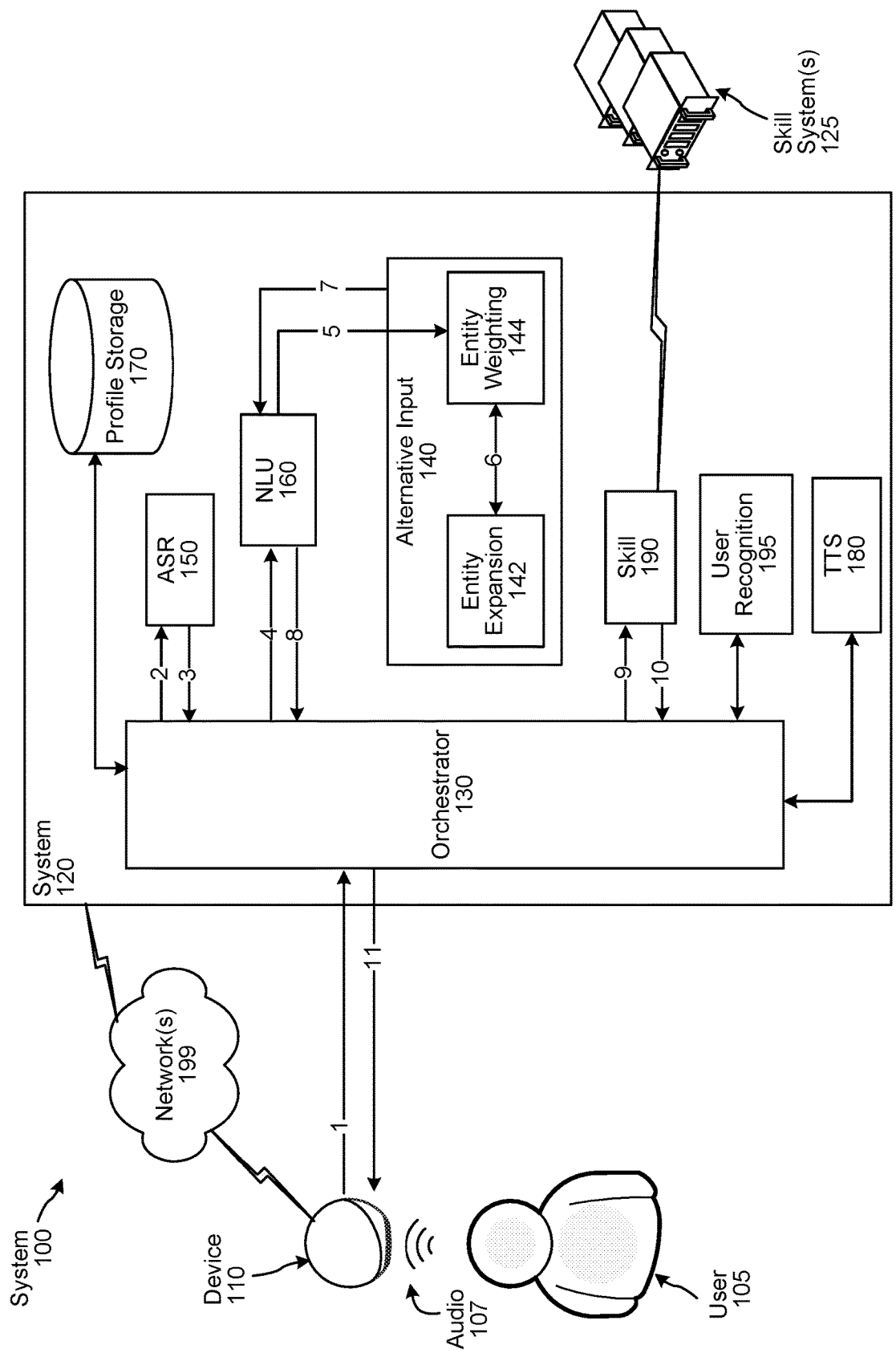
FIG. 1 is a conceptual diagram illustrating a system for determining an alternative representation for a user input using entity expansion and weighting techniques, according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Natural Language Generation (NLG) is a field of computer science, artificial intelligence, and linguistics concerned with transforming system data into human understandable language representations. Text-to-speech (TTS) is a field of concerning transforming textual data into audio data that is synthesized to resemble human speech, and can be used with NLG to provide a synthetic voice user interface.

Certain systems may be configured to perform actions responsive to user inputs. For example, for the user input of "Alexa, play [person's name]," a system may output music sung by the indicated artist. For further example, for the user input of "Alexa, what is the temperature," a system may output synthesized speech representing either outside weather information for a geographic location of the user, inside temperature based on a smart thermostat's ambient temperature sensor, or a temperature setting as to what temperature the thermostat is set to keep the ambient temperature.

A system may receive a user input as speech. For example, a user may speak an input to a device. The device may send audio data, representing the spoken input, to the system. The system may perform ASR processing on the audio data to generate data (e.g., ASR data, token data or text data) representing the words spoken by the user. The system may perform NLU processing on the ASR data to determine an intent of the user input as well as portions of the input that may be used to perform an action.

In some cases, the system may perform an action that is not responsive to the user input or is not the user-desired action. Such may occur due to an error in ASR processing, where the system may misrecognize one or more words spoken by the user. In other cases, such may occur due to an error in NLU processing, where the system misinterprets the user's intent. In yet other cases, such may occur due to the user referring to an entity not known to the system. For example, the user may want to play a first song, but instead of requesting the song by name, the user may request the song using its lyrics and artist name but state the wrong lyrics or artist name—the user may say "Play [lyrics] by [artist name]," where the lyrics correspond to a first song by a different artist. The system may not be able to identify the correct song, and may output a song not desired by the user or may output synthesized speech indicating the system did not understand what the user requested.

To reduce such situations from occurring, the system may employ one or more techniques for query or other type of input rewriting that involve one or more alternative input components determining at least one alternative input representation of the user input, such that the alternative input representation results in the user-desired action being performed. As an example, for the user input "Play [lyrics] by [artist name]" the system may determine an alternative input representation of "Play [song name] by [artist name]", where the [song name] corresponds to the desired song. Using the alternative input representation, the system can output the desired song.

Input rewriting techniques generally involve using historic interaction data, where the user rephrases an initial user input in an attempt to get the system to perform the desired action. The rephrased user input may be used to determine the alternative input representation of a subsequently-received user input, and the alternative input representation may be used for NLU and other processing by the system to perform a desired action.

Query expansion is an example approach that can be effective to enrich the original user input and to determine an alternative input representation. Query expansion may involve adding or replacing portions of the original user input with other relevant information. As an example, the user input "Play [lyrics] by [artist name]" may be converted to "Play [song name] by [artist name]" by replacing [lyrics] with the relevant [song name]. To achieve query expansion, correlations between a user input and its expansion candidates are considered and one or more relevant candidates may be selected for the alternative input representation. Entity weighting is also an effective approach for emphasizing the key words in a user input and to enable output of a desired system response.

The present disclosure relates to integrating query expansion and entity weighting together to provide an improved technique for query rewriting. A system first establishes an entity expansion knowledge base by categorizing and linking entities in an entity catalog, which includes user inputs, system responses and corresponding entities. The entity expansion knowledge base contains connections between different entities, which are determined by categorizing entities based on their occurrences/inclusions in user inputs and system responses, both of which are obtained from interactions that resulted in desired system responses.

The system then uses an entity weighting model to weighting (score) entities included in the user input and expansion entities identified from the entity expansion knowledge base. By integrating entity weighting with query expansion, the system can determine alternative input representations that are more relevant to the user's intent. An alternative input representation determined as described herein can include a combination of an original entity (mentioned in the user input) and an expansion entity identified from the entity knowledge base.

The techniques of the present disclosure result in an improved user experience. For example, the user may receive more desired responses based on the system determining alternative input representations when the system misunderstands spoken inputs or when the user misidentifies entities.

Teachings of the present disclosure may be configured to incorporate user permissions and may only be performed if approved by a user. As such, the systems, devices, components, and techniques described herein would be typically configured to restrict processing where appropriate and only process user data in a manner that ensures compliance with all appropriate laws, regulations, standards, and the like. The teachings of the present disclosure can be implemented on a geographic basis to ensure compliance with laws in various jurisdictions and entities in which the computing components and/or user are located.

FIG. 1 shows a system 100 configured to use entity expansion and entity weighting techniques to determine an alternative input representation for a user input. As shown in FIG. 1, the system 100 may include a device 110, local to a user 105, and in communication with a system 120 across one or more networks 199. The network(s) 199 may include the Internet and/or any other wide- or local-area network, and may include wired, wireless, and/or cellular network hardware. Although the figures and discussion of the present disclosure illustrate certain steps in a particular order, the steps described may be performed in a different order (as well as certain steps removed or added) without departing from the present disclosure.

The system 120 may be a speech processing system configured to process spoken natural language inputs using ASR and NLU processing. The system 120 may include multiple components to facilitate speech processing, such as, an orchestrator component 130, an ASR component 150, a NLU component 160, and one or more skill components 190. The system 120 may also include a profile storage 170, a TTS component 180, and a user recognition component 195 to facilitate processing of users' inputs and generating outputs. The system 120 may be in communication with a skill system(s) 125.

As shown in FIG. 1, in some embodiments, the system 120 may include an alternative input component 140 configured to determine one or more alternative input representations for a user input (e.g., a spoken input, a textual input, etc.) provided by a user. In some cases, certain spoken inputs may be misrecognized by the ASR component 150; in some cases, certain user inputs may be misinterpreted by the NLU component 160; and in some cases, the user 105 may misidentify an entity. All these cases can result in performance of an action that is undesired by the user or unresponsive to the user input. The alternative input component 140 may determine an alternative input representation (e.g., a rephrased user input, a rewrite of the user input, etc.), for the user input, that results in a desired action being performed. For example, the user 105 may provide a user input "play [lyrics] by [artist name]" intending to request playback of a [song name] with the [lyrics] sung by the [artist name]. The NLU component 160 may be unable to identify the [song name] using the lyrics. The alternative input component 140 may determine an alternative input representation for the user input as "play [song name] by [artist name]", which the NLU component 160 and the skill component 190 may use to identify and play the song desired by the user 105. In some embodiments, as described herein, the alternative input component 140 may use entity expansion techniques and entity weighting techniques to determine the alternative input representation.

Referring to FIG. 1, the user 105 may speak an input, and the device 110 may capture audio 107 representing the spoken input. In other examples, the user 105 may provide another type of input (e.g., textual input, selection of a button, selection of one or more displayed graphical interface elements, performance of a gesture, etc.). The device 110 may send (step 1) input audio data (or other type of input data, such as, image data, text data, etc.) to the system 120 for processing. The orchestrator component 130 may receive the input data from the device 110. In the case where the input data is audio data representing a spoken input, the orchestrator component 130 may send (step 2) the audio data to the ASR component 150, and the ASR component 150 may process the audio data to determine ASR data (e.g., token data, text data, one or more ASR hypotheses including token or text data and corresponding confidence scores, etc.) corresponding to the words spoken by the user 105. Details on how the ASR component 150 may process the audio data are described below. The ASR component may send (step 3) the ASR data to the orchestrator component 130.

The orchestrator component 130 may send (step 4) the ASR data to the NLU component 160, and the NLU component 160 may process the ASR data to determine NLU data (e.g., including one or more NLU hypotheses each including intent data, entity data and a corresponding confidence score, etc.) corresponding to the spoken input. In the case the input data is other than audio data, the orchestrator component 130 may send the input data to the NLU component 160, and the NLU component 160 may determine NLU data corresponding to the input data. Details on how the NLU component 160 may process the audio data are described below.

The NLU component 160 may send (step 5) the ASR data (in case of spoken inputs) and the NLU data corresponding to the user input to the alternative input component 140. Before determining an alternative input representation for the spoken input, the alternative input component 140, in some embodiments, may determine whether or not the system 120 will output an undesired response to the spoken input. The alternative input component 140 may determine, using the ASR data and/or the NLU data, whether the system 120 is going to output an undesired response to the spoken input. The alternative input component 140 may make this determination based on one or more confidence scores (included in the ASR data and/or the NLU data) satisfying a condition (e.g., being below a threshold value, two or more ASR confidence scores being similar, two or more NLU confidence scores being similar, etc.) indicating that the ASR component 150 or the NLU component 160 is not confident in its processing (e.g., misunderstood what the user said, misinterpreted what the user said, is unsure which words the user said, etc.). In some embodiments, the alternative input component 140 may determine that the system 120 will output an undesired response based on past interaction data indicating the user 105 (or other users) have received undesired responses in the past when the user input corresponds to the ASR data or the NLU data for the instant user input. Other techniques may be used by the alternative input component 140 to determine that the system 120 will output an undesired response to the spoken input.

In some embodiments, the alternative input component 140 may determine an alternative input representation for the user input without determining whether or not the system 120 will output an undesired response to the user input.

The alternative input component 140 may determine one or more alternative input representations using the ASR data and/or the NLU data corresponding to the user input. In some embodiments, the alternative input component 140 may include an entity expansion component 142 and an entity weighting component 144.

The entity expansion component 142 may store or communicate with an entity expansion knowledge base 240 (shown in FIG. 2 and described in detail below). The entity expansion knowledge base 240 may represent connections between various entities based on their occurrence/inclusion in pairs, where each pair includes a past user input and corresponding past system response. The entity expansion knowledge base 240 may be built by extracting entities from past user input-system response pairs that resulted in satisfactory experiences. An extracted entities may be associated with an initial level/score based on its occurrence (inclusion) in the past user input only (level/score 1), in the past system response only (level/score 2) or both the past user input and the past system response (level/score 3). Entities co-occurring in the past user input-system response pairs may be connected in the knowledge base. An overall score may be associated with the connections based on the initial level/scores of the individual entities.

In some embodiments, the entity expansion component 142 may receive first data representing a pair of first past user input-first past system response (corresponding to the first past user input), and may determine a first entity, a second entity and a third entity are represented in the first data. The entity expansion component 142 may determine scores corresponding to the entities based on its occurrence/inclusion in the pair. For example, the entity expansion component 142 may determine the first entity corresponds to a first score based on the first entity being represented in the first past user input, may determine the second entity corresponds to a second score based on the second entity being represented in the first past system response, and may determine the third entity corresponds to a third score based on the third entity being represented in both the first past user input and the first past system response. The entity expansion component 142 may store, in the entity expansion knowledge base 240, a first node representing the first entity, a second node representing the second entity, and a third node representing the third entity. The entity expansion component 142 may also store, in the entity expansion knowledge base 240, a first association between the first node and the second node, where the first association may correspond to a fourth score based on the first score and the second score, and may store a second association between the first node and the third node, where the second association may correspond to a fifth score based on the first score and the third score. Further details on the entity expansion knowledge base 240 are described in relation to FIG. 2.

The entity weighting component 144 may receive (step 5) the ASR data and/or the NLU data corresponding to the user input. The entity weighting component 144 may retrieve (step 6) one or more expansion entities, from the entity expansion knowledge base 240, related to an entity corresponding to the user input. For example, the NLU data (determined by the NLU component 160) may include a first entity corresponding to the user input, and the entity weighting component 144 may query the entity expansion component 142 for one or more entities related to the first entity in the entity expansion knowledge base 240. If the user input includes another entity, for example a second entity, then the entity weighting component 144 may query the entity expansion component 142 for one or more entities related to the second entity also. Details on the how the entity expansion component 142 may determine expansion entities related to an entity corresponding to the user input are described in relation to FIG. 4.

The entity weighting component 144 may rank the entity (e.g., the first entity and/or the second entity) corresponding to the user input and the related expansion entity/entities. For ranking the entities, the entity weighting component 144 may determine a score/level for each entity based on user inputs-alternative input representation pairs. In some embodiments, the entity weighting component 144 may use a classifying component configured using pairs of user input-alternative input representations, where the classifying component is configured to categorize an entity to one of: a first level representing the entity potentially/likely is included (occurs) in a user input; a second level representing the entity potentially/likely is included (occurs) in an alternative input representation; and a third level representing the entity potentially/likely is included (occurs) in both a user input and an alternative input representation.

The classifying component may be configured using first data representing a first pair of first user input-first alternative input representation (corresponding to the first user input), where the first data may be labeled to indicate that a first entity is represented in the first user input and a second entity is represented in the first alternative input representation. Second data may also be used representing a second pair of second user input—a second alternative input representation (corresponding to the second user input), where the second data may be labeled to indicate that a third entity is represented in the second user input and a fourth entity is represented in the second alternative input representation. The classifying component may be configured to categorize entities based on them potentially occurring in user inputs and/or alternative input representations.

The entity weighting component 144 may determine a weighted list of entities based on the levels determined by the classifier, where entities corresponding to the third level may be weighted higher than entities corresponding to the second level, and entities corresponding to the second level may be weighted higher than entities corresponding to the first level. In some embodiments, entities corresponding to the first level may be excluded from the weighted list of entities. Further details on how the entities may be weighted are described in relation to FIGS. 4 and 5.

The alternative input component 140 may determine one or more alternative input representations, corresponding to the user input, using the weighted list of entities. For example, a first alternative input representation may include at least a first expansion entity, a second alternative input representation may include at least the a second expansion entity, etc. As further example, a third alternative input representation may include a first entity (included in the original user input) and a first expansion entity, a second alternative input representation may include the first entity and a second expansion entity, etc. An additional example of how the weighted list of entities is used to determine an alternative input representation(s) is described in relation to FIG. 6.

The alternative input component 140 may send (step 7) the alternative input representation(s) for the user input to the NLU component 160. An alternative input representation may be text data or token data corresponding to an entire input, such that the alternative input representation may be used by the NLU component 160, like an ASR hypothesis, to determine an NLU hypothesis corresponding to the alternative input representation. In some embodiments, the alternative input component 140 may also send, to the NLU component 160, intent data, entity data or a NLU hypothesis (including intent data, entity data, and a NLU processing score previously determined by the NLU component for the alternative input representation with respect to processing of a previous user input) corresponding to the alternative input representation.

The NLU component 160 may determine a merged list of NLU hypotheses, that may include one or more NLU hypotheses corresponding to the user input (determined by the NLU component 160) and one or more NLU hypotheses corresponding to the alternative input representation(s). In some embodiments, the NLU component 160 may select a NLU hypothesis, corresponding to an alternative input representation, for further processing (e.g., may select the NLU hypothesis based on the corresponding NLU confidence score or a confidence score determined by the alternative input component 140). As such, the NLU component 160 may send (step 8) NLU data to the orchestrator component 130, where the NLU data may include intent data and entity data corresponding to the alternative input representation for the user input. The NLU component 160 (or another component) may determine a skill component 190 capable of processing the intent data and the entity data corresponding to the alternative input representation, and may send a skill identifier for the skill component 190 to the orchestrator component 130. In other embodiments, the NLU component 160 may send the merged list of NLU hypotheses to the orchestrator component 130.

The orchestrator component 130 may send (step 9) the intent data and the entity data corresponding to the alternative input representation to the skill component 190 to perform an action responsive to the alternative input representation. The skill component 190 may determine output data, using the intent data and the entity data corresponding to the alternative input representation, and may send (step 10) the output data to the orchestrator component 130. The output data may be a natural language output (e.g., text data, structured data, etc.) that may be processed by the TTS component 180 to generate audio data representing synthesized speech. The output data may be another type of data (e.g., audio data corresponding to music, a file location identifier for a song, video data corresponding to a movie, image data corresponding to weather information, etc.). The orchestrator component 130 may send (step 11) the output data to the device 110 for output to the user 105 in response to the user input. As such, the system 120 may output data corresponding to an alternative input representation in response to a user input.

Figure 2:
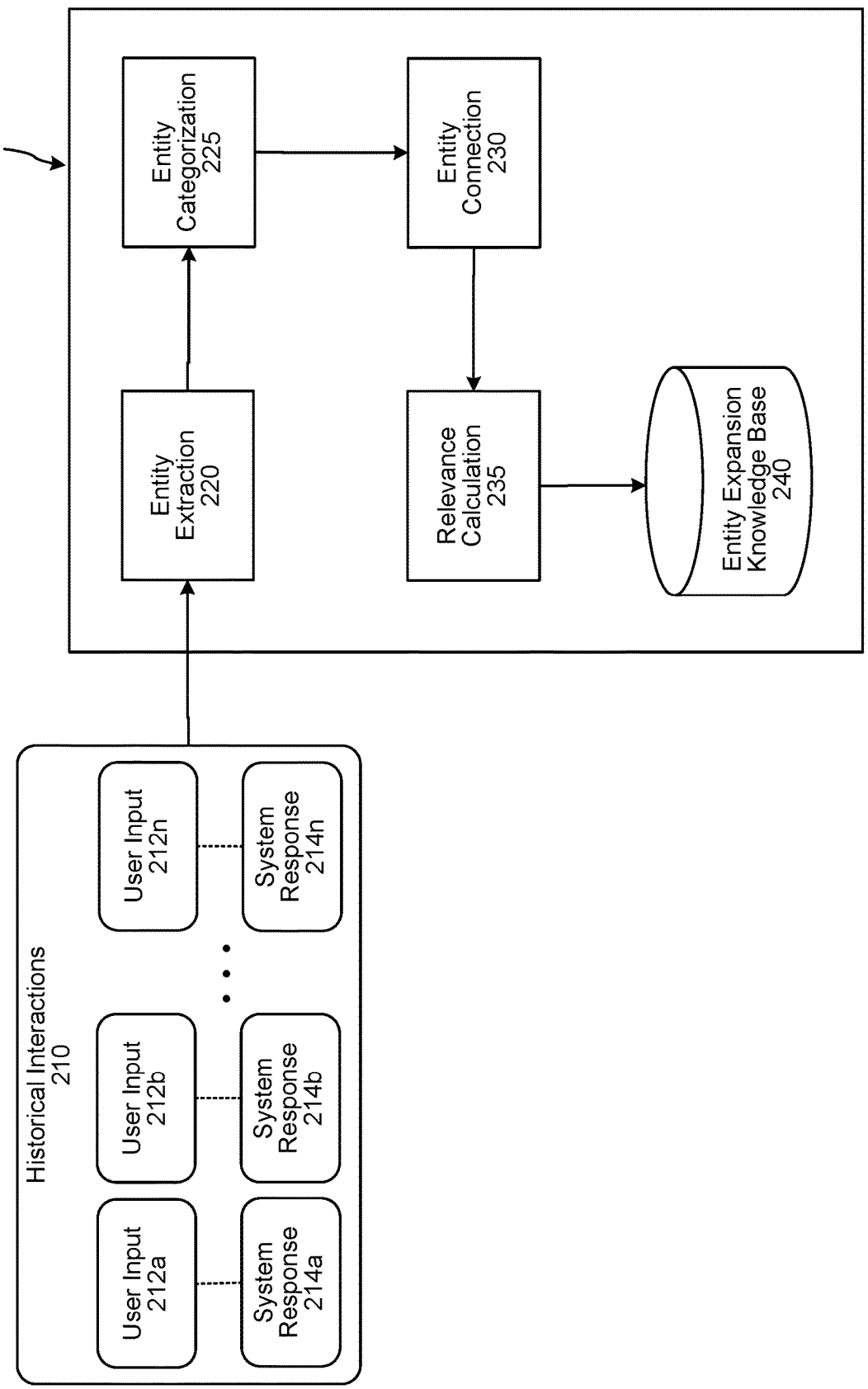
FIG. 2 is a conceptual diagram illustrating an entity expansion component to generate an entity expansion knowledge base, according to embodiments of the present disclosure.

FIG. 2 is a conceptual diagram illustrating how the entity expansion component 142 may generate data for an entity expansion knowledge base 240. In some embodiments, the entity expansion component 142 may include an entity extraction component 220, an entity categorization component 225, an entity connection component 230, and a relevance calculation component 235.

The entity expansion component 142 may build the entity expansion knowledge base 240 using an entity catalog including user inputs, desired systems responses, and an entity list where each entity is represented in a corresponding pair of user input-system response. This entity catalog is able to provide corrections for inaccurate entities; and the system responses can also help to indicate entities' relative importance. By connecting each entity with others and categorizing each entity according to its existence in the user input and the system response, the entity expansion knowledge base 240 can be established with the relationships between different types of entities. Therefore, a user input can be expanded by finding the most relevant expansions in the entity expansion knowledge base 240 for each entity in the user input.

Nodes in the entity expansion knowledge base 240 are entities from the entity catalog, and each node is connected with others when both nodes appear in the same user input-system response pair in the entity catalog. The score on the edge/connection indicates the overall relevance level of two nodes. For an entity in one entry, its current relevance level is based on its occurrence/inclusion in a user input-system response pair. Level 1 means that this entity only exists in the user input; level 2 represents that it only exists in the system response; and level 3 indicates that it exists in both the user input and system response. The concept is that the higher the relevance level, the more relevant the corresponding entity is to the query. The overall relevance level score between two connected nodes may be defined as the sum of the product of their respective scores each time they appear together.

Once the entity expansion knowledge base 240 is built, it can be used to expand a specific user input. For each entity in the original user input, its most relevant nodes (ranked according to the overall relevance score) is obtained from the knowledge base 240. However, since typically only limited expansions are useful for reformulation retrieval, the entity weighting component 144 can help weight/score the expansion entities. For example, some of the expanded phases may be assigned weight=0 and may be removed from consideration.

In some embodiments, the entity expansion component 142 may process historical interactions data 210 during offline operations, and on a periodic-basis (e.g., when new or updated historical interaction data 210 is available, each month, each week, etc.). The historical interactions data 210 may correspond to user inputs 212 received by the system 120 from multiple different users. The user inputs 212 may be represented as text data or token data. The user inputs 212 may correspond to spoken inputs, textual inputs, gesture inputs, or other types of inputs provided by the users. The historical interactions data 210 may also include system responses 214 corresponding to the individual user inputs 212. A system response 214 may correspond to an action performed in response to a corresponding user input 212. A system response 214 may be represented as text data, token data, or other meaning representation data. As an example, the user input 212a may be "Play [lyrics] by [artist name]" and the system response 214a may be "Play [song name] by [artist name]." As another example, the user input 212b may be "Turn on bedroom tv" and the system response 214b may be "Turn on [brand name] tv in bedroom."

In some embodiments, the historical interactions data 210 may include data corresponding to satisfactory interactions, where the user was satisfied with the system response 214 to the user input 212. The system 100 may employ one or more feedback determining techniques to determine whether the user was satisfied with the system response 214. Based on determining that the user was satisfied with the system response 214, the user input 212 and corresponding system response 214 may be tagged (e.g., associated with a label/flag) as a satisfactory interaction.

The system 100 may leverage implicit and/or explicit user feedback to determine whether an interaction was satisfactory. Implicit user feedback may refer to feedback that is derived, by the system, from some action performed by a user. For example, the system may determine implicit user feedback based on a user making certain sounds (e.g., sighing, giggling, etc.), a user interrupting output of the system response, for example, with another user input, a user requesting output of the system response be stopped/canceled, a user indicating a particular sentiment or emotion during output of the system response, etc. Explicit user feedback may refer to feedback specifically provided by a user in response to a prompt for such feedback by the system. For example, after outputting the system response, the system may cause a device to output the synthesized speech "did I answer your question," "did I respond correctly," or a similar natural language output requesting feedback from the user. The user may respond to such an output by saying "yes" (or another similar affirmative response) or "no" (or another similar negative response), or by providing feedback in other input forms, such as via a touchscreen of the device, by performing a gesture (e.g., thumbs up, thumbs down, etc.) that is captured by a camera of the device, providing a facial expression (e.g., a smile, a frown, etc.) that may be captured by a camera of the device, selecting a button on the device, etc.

The system may determine whether an interaction was satisfactory or unsatisfactory based on explicit and/or implicit feedback corresponding to the system response. An interaction may be satisfactory when the user is satisfied with the system response to the user input, and may provide positive feedback or non-negative feedback in response to the system response. An interaction may be unsatisfactory when the user is unsatisfied with the system response, may provide negative feedback in response to the system response (e.g., express some frustration with the system response). Examples of positive user feedback may be the user saying "thank you," the user smiling or nodding the user's head, the user showing a thumbs up gesture, the user providing another input to continue the interaction, etc. Examples of negative user feedback may be the user saying "that's not what I wanted," the user interrupting the output by saying "cancel" or "stop," the user frowning or shaking the user's head, the user showing a thumbs down gesture, the user rephrasing or repeating the user input, etc.

The entity extraction component 220 may process the historical interactions data 210 to extract entities and corresponding entity types. An entity may be a place, a person or a thing. Examples of entities may be a song name, an artist name, a device name, a person's name, etc. Examples of entity types may be song, artist, device, person, etc. The entity extraction component 220 may employ one or more named entity recognition (NER) techniques to identify entities represented in a user input 212 and corresponding system response 214.

One NER technique may include semantic tagging, which is the labeling of a word or combination of words according to their type/semantic meaning. The NER technique may include parsing text data or token data using heuristic grammar rules, or a model may be constructed using techniques such as hidden Markov models, maximum entropy models, log linear models, conditional random fields (CRFs), and the like. For example, NER processing of text/token data representing "play [song name]" may determine an entity type of "SongName" and an entity value corresponding to the indicated song name. For further example, NER processing of the text/token data representing "turn on bedroom tv" may determine an entity type of "Device" and an entity value corresponding to "tv."

The entity extraction component 220 may extract entities from individual user inputs 212 and the corresponding system responses 214. The entity extraction component 220 may send data representing the extracted entities and corresponding entity types to the entity categorization component 225. Such data may include labels/tags associated with each individual entity, where the label/tag may indicate whether the associated entity was extracted from the user input 212, the system response 214, or both. The label/tag may be text data, and may be a numerical value (e.g., "0" for user input; "1" for system response), an alphabet value (e.g., "U" for user input; "S" for system response), or a Boolean value (e.g., "yes"/"true" or "no"/"false"). In some embodiments, the entity extraction component 220 may individually/separately process each pair of user input 212 and system response 214, and may group the entities (and corresponding entity types and labels/tags) based on individual user inputs-system response pairs. For example, first entity data may represent entities, entity types and labels/tags based on processing the user input 212a and the system response 214a; second entity data may represent entities, entity types and labels/tags based on processing the user input 212b and the system response 214b; and so on.

The entity categorization component 225 may be configured to determine a "level" for each entity extracted by the entity extraction component 220. The entity categorization component 225 may process each pair of user input-system response individually/separately to determine the "level." A "level" may refer to an indication, a tag, or other label data identifying whether the entity is represented in the user input 212 only, the system response 214 only, or in both of the user input 212 and the system response 214. The entity categorization component 225 may categorize each entity based on its occurrence/inclusion in the user input and/or the system response. The entity categorization component 225 may associate "level 1" with an entity based on the entity only occurring in the user input, "level 2" may be associated with an entity based on the entity only occurring in the system response, and "level 3" may be associated with an entity based on the entity occurring in both the user input and the system response. Below is an example of a user input, corresponding system response, and associated levels for entities.

User input: "Play [lyrics] by [artist name]"
System response: "Play [song name] by [artist name]"
First entity: "[lyrics]"-level 1
Second entity: "[artist name]"-level 3
Third entity: "[song name]"-level 2

Using the above example for determining levels for an entity, a lower level (level 1) indicates that the entity is likely incorrect (or will result in an undesired system response) as the entity is not included in the system response. A higher level (level 3) indicates that the entity is very relevant in resulting in a satisfactory interaction because it is included/occurs in both the user input and the system response. In other embodiments, the entity categorization component 225 may use a different mechanism or a different scheme for the levels. For example, a higher level may indicate that the entity is only included/only occurs in the user input, while a lower level may indicate that the entity is included/occurs in both the user input and the system response. Instead of numerical levels, the entity categorization component 225 may use an alphanumeric level or other type of data to represent the different levels.

The entity categorization component 225 may provide data, referred to herein as categorization data, to the entity connection component 230. The categorization data may indicate entities, corresponding entity types and associated levels for individual user inputs 212 and system responses 214. The entity connection component 230 may be configured to build a graph connecting entities (of the same interaction), and assigning an initial score to the connections/edges based on the levels associated with the entities. For every two entities that is included/occurs in the interaction (the user input 212 and the corresponding system response 214), the entity connection component 230 may connect such two entities, and determine the connection/edge initial score to be an aggregation of the associated levels. For example, the graph may include a first node representing a first entity associated with level 1, a second node representing a second entity associated with level 3, and a first edge between the first node and the second node, where the first edge is associated with an initial score 4 (level 1+level 3).

The entity connection component 230 may process each pair of user input-system response separately, and may add nodes to the graph to represent new entities occurring in the historical interactions data 210. The same two entities may occur/may be included in different interactions, thus, the two entities may have multiple co-occurrence and multiple initial scores. For example, the graph may include a second edge between the first node and the second node based on the first entity and the second entity being represented in the user input 212b and the system response 214b. The second edge may be associated with a second initial score based on the levels associated with the first entity and the second entity based on processing the user input 212b and the system response 214b.

In an example embodiment, the entity connection component 230 may use the below algorithm to generate graph data representing connections between entities.

```
Input: ENTITY CATALOG C = {(C_i), 1 ≤ i ≤ K,
    where C_i = {User_Input_i, System_Response_i, Entity_i},
    where Entity_i ← unique entities in {User_Input_i, System_Response_i}
    KG ← { }
or i ∈ {1, . . . , K} do
for entity_j in Entity_i do
    if entity_j in User_Input_i, System_Response_i then
        Level_j ← 3
    else if entity_j in System_Response_i then
        Level_j ← 2
    else
        Level_j ← 1
    end if
end for
for entity_m, entity_n in Entity_i, m != n do
    KG[entity_m][ entity_n] += level_m × level_n
    KG[entity_m][ entity_n] += level_n × level_m
end for
end for
```

The graph generated by the entity connection component 230 may be provided to the relevance calculation component 235, which may determine an overall relevance score for every two entities, connected with an edge, in the graph. In some embodiments, the overall relevance score for an edge may be the sum of the initial scores associated with the edges connecting the two entities. Continuing with the above example, the overall relevance score for the first node and the second node may be the sum of the initial score of the first edge and the initial score of the second edge. In other embodiments, the overall relevance score may be an average of the initial scores associated with the edges connecting the two entities. The relevance calculation component 235 may also consolidate the edges occurring between two entities, so that the graph now only has one edge between the two entities, and the one edge is associated with the overall relevance score. The resulting graph may be stored in the entity expansion knowledge base 240.

Figure 3:
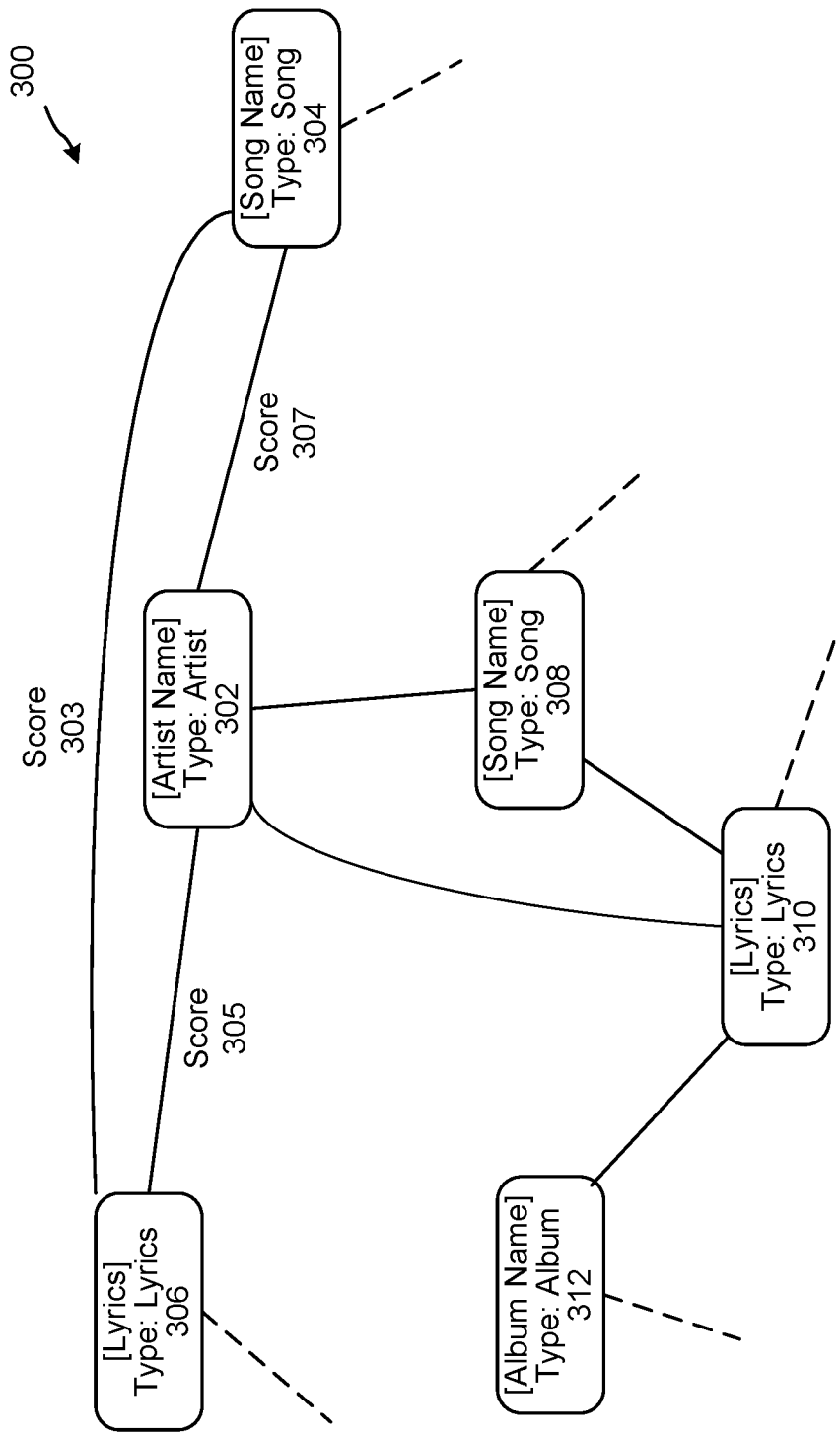
FIG. 3 illustrates example data included in the entity expansion knowledge base, according to embodiments of the present disclosure.

The entity expansion knowledge base 240 may store data representing connections between two entities, where the connections are determined according to the processing described above. The connections may be associated with a score. In some embodiments, such data may be stored as graph data. FIG. 3 illustrates example graph data 300 that may be stored at the entity expansion knowledge base 240. Each entity may be represented as a node, as shown in FIG. 3. For example, a first node 306 may represent [lyrics] and may be associated with entity type "Lyrics", a second node 302 may represent [artist name] and may be associated with entity type: "Artist", and a third node 304 may represent [song name] and may be associated with entity type: "Song." The node 302 may be connected to the node 304 and the connection may be associated with a score 307. The node 302 may be connected to the node 306 and the connection may be associated with a score 305. The node 304 may be connected to the node 306 and the connection may be associated with a score 303. As another example, the node 302 may be connected to a node 308 and a node 310, and the node 310 may be connected to a node 312.

The entity expansion knowledge base 240 may store the data, representing connections between two entities, in other forms, such as table data including entries for individual entities and entries representing connections between two entity entries.

The data for the entity expansion knowledge base 240 may be determined prior to receiving a user input per step 1 described above in relation to FIG. 1. The entity expansion knowledge base 240 may then be used to determine one or more expansion entities as described herein.

The entity weighting component 144 may be configured for weighting entities in the original user input as well as expansions entities from the entity expansion knowledge base. The training data may be user input-alternative input representation pairs, and the rank/weight to be predicted for each entity may be a specific score level based on the alternative input representation.

The task of the entity weighting component 144 is defined as predicting the score level of all entities (both original and expanded) for a given user input. Entities that exist in the alternative input representations of the training data may have higher score levels while those entities that are not in the alternative input representations may have lower score levels. The score level of each entity may be assigned according to the existence in the labeled user input and alternative input representation pairs: 1) if this entity exists neither in the original user input nor in the alternative input representation, the score level is labeled as 0; 2) the score level of entities in the original user input will be labeled as 1; and 3) the score level of entities in the alternative input representation will be labeled as 2, which indicates the most important weight.

The scoring training task may be defined as: given a query Q with m entities $E_1, E_2, \ldots, E_m$ and each entity $E_i$ has k expansions $E_i^1, E_i^2, \ldots E_i^k$, the target is to predict the importance score $l_p$ for every entity $E_p$ (both original user input and expanded) where $1 \leq p \leq m(k+1)$. Some embodiments use a hierarchical model (illustrated in FIG. 5) to predict each entity's weight, which improves at learning the relationships between each entity and its expansions, rather than attempting to predict the entity scores in one stage.

Figure 4:
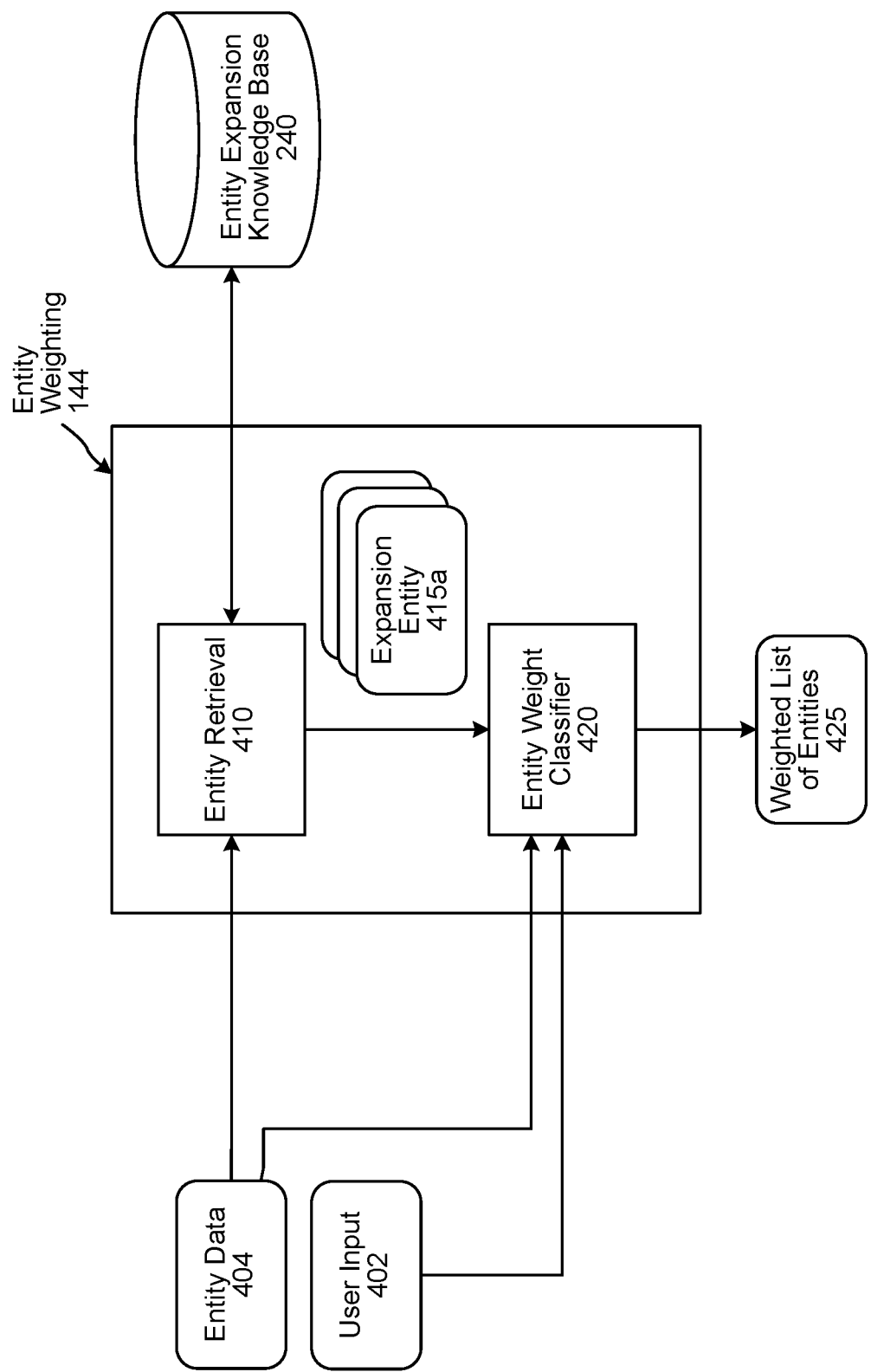
FIG. 4 is a conceptual diagram illustrating an entity weighting component, according to embodiments of the present disclosure.

FIG. 4 is a conceptual diagram illustrating the entity weighting component 144. In some embodiments, the entity weighting component 144 may include an entity retrieval component 410 and an entity weight classifier component 420. The entity weighting component 144 may receive, as inputs, user input 402 and entity data 404. The user input 402 may be text data or token data representing an input provided by the user 105, where the input may be a spoken input, a textual input, a gesture input, or other type of input. The entity data 404 may represent one or more entities, and corresponding entity types, included in the user input 402. The entity data 404 may be determined by the NLU component 160 as described herein.

The entity retrieval component 410 may use the entity data 404 to determine one or more corresponding expansion entities from the entity expansion knowledge base 240. The entity retrieval component 410 may perform one or more search techniques to search the data stored at the entity expansion knowledge base 240. In performing the search, the entity retrieval component 410 may determine one or more entities connected to the entities represented in the entity data 404. For example, the entity data 404 may represent first lyrics, the entity retrieval component 410 may determine a first node representing the first lyrics is connected to a second node representing a song name; entity type: "Song", and may determine a third node representing an artist name; entity type: "Artist" connected to the first node. In this example, the expansion entity 415a may represent the song name; entity type: "Song" of the second node, and the expansion entity 415b may represent the artist name; entity type: "Artist" of the third node. As a further example, the entity data 404 may represent an artist name, the entity retrieval component 410 may determine a first node representing the artist name is connected to a second node representing a song name; entity type: "Song", and may determine a third node representing an album name; entity type: "Album" connected to the first node. In this example, the expansion entity 415c may represent the song name; entity type: "Song" of the second node, and the expansion entity 415d may represent the album name; entity type: "Album" of the third node.

In determining the expansion entities 415 that are relevant to the entity data 404 from the entity expansion knowledge base 240, the entity retrieval component 410 may consider the overall relevance score for the connections between entities. The entity retrieval component 410 may retrieve the top K overall relevance scoring entities that are connected to a node representing an entity included in the entity data 404. Additionally, the entity retrieval component 410 may also retrieve the overall relevance score, which may be used by the entity weight classifier component 420 in some embodiments.

The entity weight classifier component 420 may receive, as inputs, the expansion entities 415, the entity data 404 and the user input 402. The entity weight classifier component 420 may output a weighted list of entities 425, which may include one or more entities from the entity data 404 and/or one or more expansion entities 415.

Figure 5:
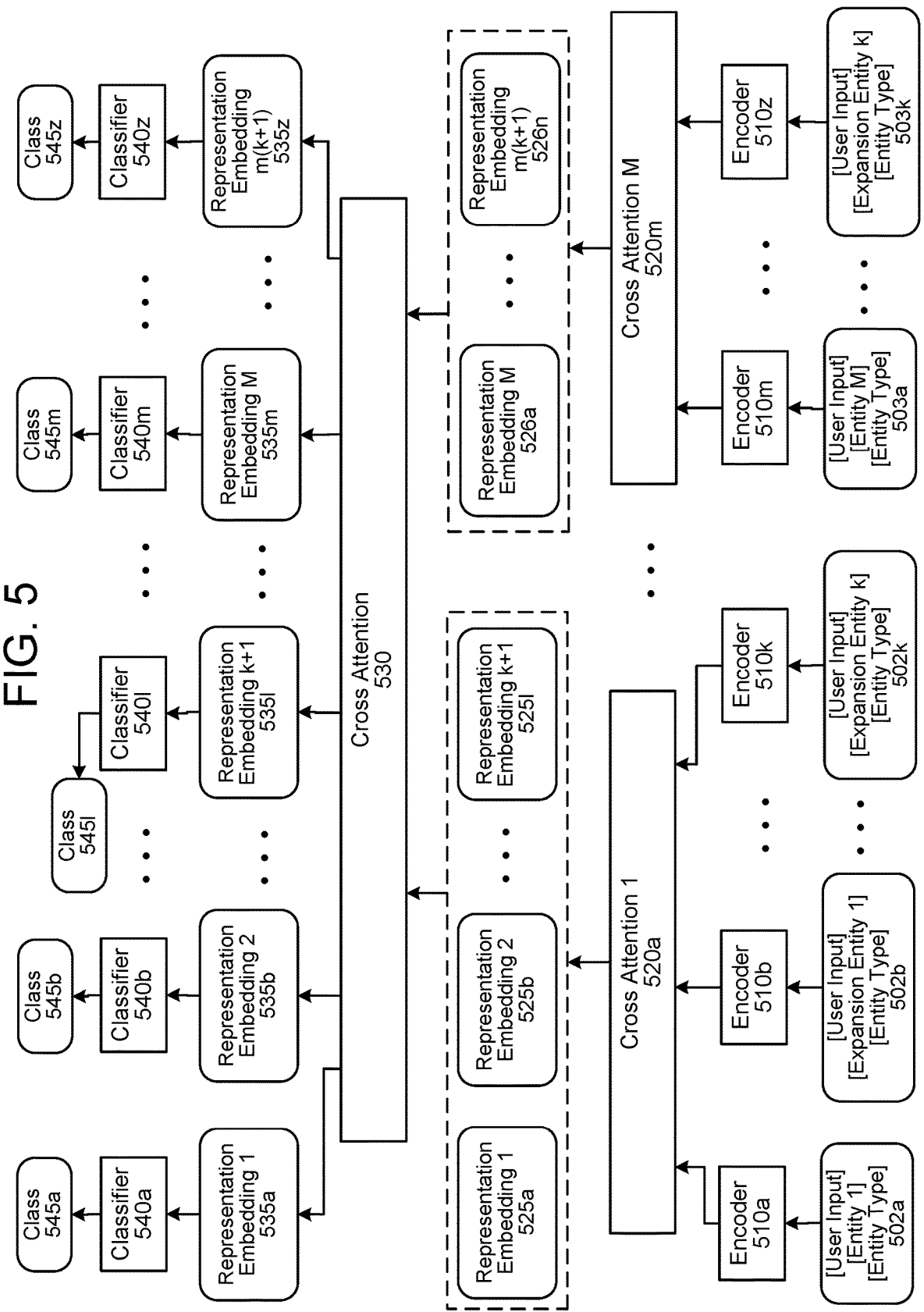
FIG. 5 is a conceptual diagram illustrating example processing that may be performed by the entity weighting component, according to embodiments of the present disclosure.

FIG. 5 is a conceptual diagram illustrating processing performed by the entity weight classifier component 420 in determining the weighted list of entities 425. The entity weight classifier component 420 may include, in some embodiments, an encoder 510, a cross attention component 520, a cross attention component 530, and a classifier 540. The entity weight classifier component 420 may use multiple instances of some of the foregoing components to process, in parallel or at substantially the same time, different portions of the inputs as described below.

The encoder 510 may be used to encode data corresponding to each entity $E_p$. Then the cross attention component 520 is applied to an entity and its corresponding expansion entities, so the cross attention component 520 can learn the relationships between each original entity and its expansions. Then, each entity's representation $rep_p$ (where $1 \leq p \leq m(k+1)$) from all the cross attention components 520 are jointly inputted to the cross attention component 530, which, thus learns the interactions between all the entities $E_p$. The outputs of the cross attention component 530 $rep'_p$ (where $1 \leq p \leq m(k+1)$) is then inputted to the classifier 540 to predict the importance score logits $g_p$. Cross-entropy may be used to calculate the loss between each entity's predicted logits $g_p$ and its true label $l_p$, and the final loss may be defined as the average of these losses:

$$L_{final} = \frac{1}{m(k+1)} \sum_{p=1}^{m(k+1)} CrossEntrophy(l_p, g_p)$$

The inputs processed by the entity weight classifier component 420 may be data 502, which may be a combination of the user input (e.g., user input 402), an entity (e.g., one entity from the entity data 404 or an expansion entity 415), and an entity type corresponding to the entity. In some embodiments, the user input, the entity and the entity type may be concatenated to form a vector. The data 502 may be text data or token data. In some embodiments, the different portions may be separated using a special token. Example data 502 may be "Play [lyrics] by [artist name] [SEQ] [lyrics] [SEQ] Lyrics", where [SEQ] may be a special token used to separate the information in the data 502. The entity weight classifier component 420 may process individual entities, for weighting purposes, separately. Thus, data 502a may correspond to a first entity [entity 1] included in the user input and the entity data 404, data 502b may correspond to a first expansion entity [expansion entity 1] (415) that is determined to correspond to the first entity [entity 1], and data 502k may corresponding to another expansion entity [expansion entity k] (415) that is determined to correspond to the first entity [entity 1].

The data 502 may be encoded using the encoder 510. In some embodiments, the entity weight classifier component 420 may use multiple instances of the encoder 510 (e.g., encoders 510a-510k) to encode, in parallel or at substantially the same time, the data 502a-502k. The encoder 510 may be a language model. Examples of the encoder 510 may be a BERT model, a Robert-base model, or another type of pre-trained language model. The outputs of the encoder 510 (the encoded versions of the data 502, which may also be referred to as embeddings) may be processed using an instance of the cross attention component 520a.

The cross attention component 520a may learn information represented in the encoded versions of the data 502a-502k based on relevancy between all the entities (user input entity and expansion entity) represented in the data 502. The cross attention component 520a may output representation embedding data 525 corresponding to individual entities represented in the data 502. Representation embedding data 525a may correspond to the first entity [entity 1] of the data 502a, and may represent the "attention" applied by the first entity to the expansion entities of the data 502b-502k. Representation embedding data 525b may correspond to the first expansion entity [expansion entity 1] of the data 502b, and may represent the "attention" applied by the first expansion entity to the first entity of the data 502a and the other expansion entities of the data 502k. In example embodiments, the cross attention component 520a is a neural network.

A user input may include multiple entities, and the expansion entities corresponding to individual entities may be processed separately. Data 503a may correspond to a second entity [entity M] included in the user input and the entity data 404, and data 503k may correspond to an expansion entity [expansion entity k] (415) that is determined to correspond to the second entity [entity M]. The data 503 may be encoded using the encoder 510. In some embodiments, the entity weight classifier component 420 may use multiple instances of the encoder 510 (e.g., encoders 510m-510z) to encode, in parallel or at substantially the same time, the data 503a-502k. The outputs of the encoder 510 (the encoded versions of the data 503, which may also be referred to as embeddings) may be processed using another instance of the cross attention component 520b.

The cross attention component 520b may learn information represented in the encoded versions of the data 503a-503k based on relevancy between all the entities (user input entity and expansion entity) represented in the data 503. The cross attention component 520b may output representation embedding data 526 corresponding to individual entities represented in the data 503. Representation embedding data 526a may correspond to the second entity [entity M] of the data 503a, and may represent the "attention" applied by the second entity to the expansion entities of the data 503k. Representation embedding data 526n may correspond to the expansion entity [expansion entity M] of the data 503k, and may represent the "attention" applied by the expansion entity to the second entity of the data 503a and the other expansion entities that may be represented in other data 503. In example embodiments, the cross attention component 520b is a neural network.

The entity weight classifier component 420 may then process the representation embedding data 525 and the representation embedding data 526 using the cross attention component 530. The cross attention component 530 may apply overall attention between all the entities included in the user input 402 and the expansion entities 415 to learn the relevance of each of the entities. The cross attention component 530 may output representation embedding data 535, where the representation embedding data 535a may correspond to the first entity [entity 1] of the data 502a, the representation embedding data 535b may correspond to the first expansion entity [expansion entity 1] of the data 502b, the representation embedding 535l may correspond to the other expansion entity [expansion entity k] of the data 502k, the representation embedding data 535m may correspond to the second entity [entity M] of the data 503a, the representation embedding data 535z may correspond to the expansion entity [expansion entity k], and so on. In example embodiments, the cross attention component 530 is a neural network.

The entity weight classifier component 420 may then process the individual representation embedding data 535 using the classifier 540. In some embodiments, the entity weight classifier component 420 may use multiple instances of the classifier 540 to process, in parallel or at substantially the same time, the individual representation embedding data 535. The classifier 540 may be configured to classify the representation embedding data 535 into one of three classes/categories. The three classes may correspond to a weight or score to be associated with the respective entity, where the weight/score may indicate the relevance of the entity for the user input 402. In some embodiments, the three classes may be (1) score 0; (2) score 1; and (3) score 2. The classes may be represented as alphanumerical or numerical labels. For example, the classes may be "score 0", "score 1", "score 2" or "0", "1", "2". Other representations of the labels may be used depending on system configurations.

The classifier 540 may be trained using pairs of user input and corresponding alternative input representation (also referred to as "rewrite"). For example, training data for the classifier 540 may include a first user input and a corresponding first alternative input representation, a second user input and a corresponding second alternative input representation, etc. The training data may be text data or token data. An alternative input representation for a user input may be a different way of phrasing the initial user input so that processing results in the system outputting a desired response to the user input. For example, a user input "play [lyrics] by [artist name]" may result in the system 120 outputting a song not requested by the user (resulting in an undesired response) because the system 120 was attempted to find a song with the name [lyrics]. An example alternative input representation for the user input may be "play [song name] by [artist name]", processing of which results in the system 120 outputting the song requested by the user, and thus, resulting in a desired response. The training data for the classifier 540 may include such pairs of user input-alternative input representation. Using the training data, the classifier 540 may learn relationships/correlations between the entities represented in the user input and the corresponding alternative input representation. For example, a user input may include two entities A and B, and the corresponding alternative input representation may include two entities A and C. The classifier 540 may be configured to classify the entity A to "score 2" based on the entity A being included in both of the user input and the alternative input representation. The classifier 540 may be configured to classify the entity C to "score 1" based on the entity C being included only in the alternative input representation. The classifier 540 may be further configured to classify the entity B to "score 0" based on the entity B being included only in the user input. Thus, the classifier is trained to determine a class for an entity based on the entity's existence in the user input and the alternative input representation. Based on the relationships and correlations learned by the classifier 540, during inference time, the classifier 540 may classify an entity based on just knowing the user input. Additionally, the classifier 540 may use the representation embedding data 535 which represents a relevance of the particular entity in view of the other entities corresponding to the user input.

As the data 502 includes an entity type corresponding to the entity, the classification performed by the classifier 540 takes into account the entity type of the entity included in the user input and the entity type of the expansion entities. For example, the user input may include a [entity name] corresponding to entity type: Movie, a first expansion entity may be [entity name] corresponding to entity type: Movie, and a second expansion entity may be [entity name] corresponding to entity type: Book. Based on the processing performed by the entity weight classifier component 420 taking into consideration entity types, the first expansion entity may be classified to a higher score than the second expansion entity, as the user input includes a same entity type as the first expansion entity.

The individual entities may be processed separately by the classifier 540. Thus, the classifier 540a may process the representation embedding data 535a to determine a class 545a (e.g., "score 0", "score 1" or "score 2") corresponding to the [entity 1]. The classifier 540b may process the representation embedding data 535b to determine a class 545b (e.g., "score 0", "score 1" or "score 2") corresponding to the [expansion entity 1], the classifier 540l may process the representation embedding data 535l to determine a class 545l (e.g., "score 0", "score 1" or "score 2") corresponding to the [expansion entity k], the classifier 540m may process the representation embedding data 535m to determine a class 545m (e.g., "score 0", "score 1" or "score 2") corresponding to the [entity M], and the classifier 540z may process the representation embedding data 535z to determine a class 545z (e.g., "score 0", "score 1" or "score 2") corresponding to the [expansion entity k].

Referring to FIG. 4, the entity weight classifier component 420 may use the class 545 associated with the entity to determine the weighted list of entities 425. For example, entities (which may be one of the entities included in the entity data 404 or one of the expansion entity 415) associated with the "score 2" class may be ranked/weighted higher than entities associated with the "score 1" class, and entities associated with the "score 1" class may be ranked/weighted higher than entities associated with the "score 0" class. In some embodiments, entities associated with the "score 0" class may not be included in the weighted list of entities 425.

Figure 6:
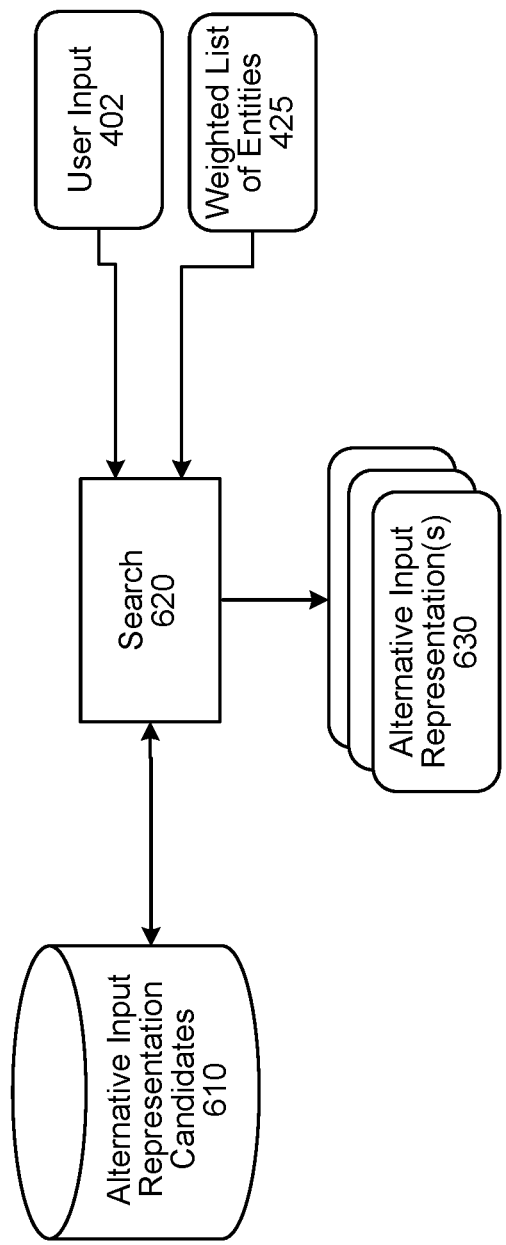
FIG. 6 is a conceptual diagram illustrating how weighted entities may be used to determine alternative input representations for a user input, according to embodiments of the present disclosure.

FIG. 6 is a conceptual diagram illustrating how weighted entities may be used to determine alternative input representation(s) for a user input, according to some embodiments of the present disclosure. The user input 402 and the weighted list of entities 425 may be inputted to a search component 620. The search component 620 may be configured to perform an ElasticSearch of an alternative input representation candidates storage 610. The alternative input representation candidates storage 610 may store data associating user inputs with respective alternative input representations. A single user input may be associated with multiple different alternative input representations (i.e. there may be multiple different ways to rephrase the same user input). The data stored in the alternative input representation candidates storage 610 may be determined using one or more query rephrase or query rewriting techniques. One such technique may be based on analyzing historical interactions between multiple different users and the system 120. A candidate stored in the alternative input representation candidates storage 610 may, in some cases, result in a desired response to the associated user input or may, in other cases, result in an undesired response to the user input. Some of the candidates in the alternative input representation candidates storage 610 may not have been further processed to determine whether or not an output using the candidate results in a satisfactory experience. The alternative input representation candidates storage 610 may be indexed data.

The search component 620 may retrieve, from the alternative input representation candidates storage 610, a plurality of alternative input representation candidates that may correspond to the user input 402 and the weighted list of entities 425. In some embodiments, the search component 620 may concatenate the user input 402 with an entity from the weighted list of entities 425 prior to searching the alternative input representation candidates storage 610. In retrieving the alternative input representation candidates, the search component 620 may also determine a matching score representing a likelihood of the candidate matching/being relevant to the user input 402. The search component 620 may recalculate (update, modify, adjust, etc.) the candidate's matching score based on the score (the class 545) associated with the entity in the weighted list of entities 425. For example, if the candidate includes a first entity (from the weighted list of entities 425) corresponding to the "score 2", then the candidate's matching score may be multiplied by a constant a. Other techniques for recalculating (e.g., boosting) the matching score for a candidate that includes a relevant entity (e.g., an entity corresponding to "score 2") may be used. Candidates associated with matching scores that satisfy a condition (e.g., are above a threshold value) may be outputted as an alternative input representation(s) 630. In some embodiments, the alternative input component 140 may determine one or more alternative input representations 630 in this manner, which may be used for further processing as described in relation to FIG. 1.

As used herein, a "domain" may refer to a collection of related functionality. A domain may be associated with one or more skills performing related functionality may be part of a domain. A non-limiting list of domains includes a smart home domain (corresponding to smart home functionality), a music domain (corresponding to music functionality), a video domain (corresponding to video functionality), a weather domain (corresponding to weather functionality), a communications domain (corresponding to one- or two-way communications functionality), and a shopping domain (corresponding to shopping functionality).

As used herein, a "skill" may refer to software, that may be placed on a machine or a virtual machine (e.g., software that may be launched in a virtual instance when called), configured to process natural language understanding (NLU) output data (e.g., including an intent and optionally one or more entities) and perform one or more actions in response thereto. What is referred to herein as a skill may sometimes be referred to as an application, bot, action, or the like. A group of skills of related functionality may be associated with a domain. For example, a first music skill and a second music skill may be associated with a music domain.

The system 120 may use other components illustrated in FIG. 1. The various components shown in FIG. 1 may be located on a same or different physical devices. Communication between various components may occur directly or across the network(s) 199.

A microphone or array of microphones (of or otherwise associated with the device 110) may capture audio. The device 110 processes audio data, representing the audio, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data, the energy levels of the audio data in one or more spectral bands, the signal-to-noise ratios of the audio data in one or more spectral bands, or other quantitative aspects. In other examples, the device 110 may implement a classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data, the device 110 may determine if the speech is directed at the device 110/system 120. In at least some embodiments, such determination may be made using a wakeword detection component 720 (shown in FIG. 7). The wakeword detection component 720 may be configured to detect various wakewords. In at least some examples, each wakeword may correspond to a name of a different digital assistant. An example wakeword/digital assistant name is "Alexa."

Wakeword detection is typically performed without performing linguistic analysis, textual analysis, or semantic analysis. Instead, the audio data is analyzed to determine if specific characteristics of the audio data match preconfigured acoustic waveforms, audio signatures, or other data corresponding to a wakeword.

Thus, the wakeword detection component 720 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid deep neural network (DNN)-HMM decoding framework. In another example, the wakeword detection component 720 may be built on DNN/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword detection component 720 detects a wakeword, the device 110 may "wake" and begin transmitting audio data 711, representing the audio, to the system 120. The audio data 711 may include the detected wakeword, or the device 110 may remove the portion of the audio data, corresponding to the detected wakeword, prior to sending the audio data 711 to the system 120.

Referring to FIG. 1, the orchestrator component 130 may be configured to, among other things, coordinate data transmissions between components of the system 120. The orchestrator component 130 may receive audio data from the device 110, and send the audio data to the ASR component 150.

The ASR component 150 transcribes the audio data into ASR output data including one or more ASR hypotheses. An ASR hypothesis may be configured as a textual interpretation of the speech in the audio data, or may be configured in another manner, such as one or more tokens. Each ASR hypothesis may represent a different likely interpretation of the speech in the audio data. Each ASR hypothesis may be associated with a score (e.g., confidence score, probability score, or the like) representing the associated ASR hypothesis correctly represents the speech in the audio data.

The ASR component 150 interprets the speech in the audio data based on a similarity between the audio data and pre-established language models. For example, the ASR component 150 may compare the audio data 711 with models for sounds (e.g., subword units, such as phonemes, etc.) and sequences of sounds to identify words that match the sequence of sounds of the speech represented in the audio data.

In at least some instances, instead of the device 110 receiving a spoken natural language input, the device 110 may receive a textual (e.g., types) natural language input. The device 110 may determine text data representing the textual natural language input, and may send the text data to the system 120, wherein the text data is received by the orchestrator component 130. The orchestrator component 130 may send the text data or ASR output data, depending on the type of natural language input received, to the NLU component 160.

The NLU component 160 processes the ASR output data or text data to determine one or more NLU hypotheses embodied in NLU output data. The NLU component 160 may perform intent classification (IC) processing on the ASR output data or text data to determine an intent of the natural language input. An intent corresponds to an action to be performed that is responsive to the natural language input. To perform IC processing, the NLU component 160 may communicate with a database of words linked to intents. For example, a music intent database may link words and phrases such as "quiet," "volume off," and "mute" to a <Mute> intent. The NLU component 160 identifies intents by comparing words and phrases in ASR output data or text data to the words and phrases in an intents database. In some embodiments, the NLU component 160 may communicate with multiple intents databases, with each intents database corresponding to one or more intents associated with a particular skill.

For example, IC processing of the natural language input "play my workout playlist" may determine an intent of <PlayMusic>. For further example, IC processing of the natural language input "call mom" may determine an intent of <Call>. In another example, IC processing of the natural language input "call mom using video" may determine an intent of <VideoCall>. In yet another example, IC processing of the natural language input "what is today's weather" may determine an intent of <OutputWeather>.

The NLU component 160 may also perform named entity recognition (NER) processing on the ASR output data or text data to determine one or more portions, sometimes referred to as slots, of the natural language input that may be needed for post-NLU processing (e.g., processing performed by a skill). For example, NER processing of the natural language input "play [song name]" may determine an entity type of "SongName" and an entity value corresponding to the indicated song name. For further example, NER processing of the natural language input "call mom" may determine an entity type of "Recipient" and an entity value corresponding to "mom." In another example, NER processing of the natural language input "what is today's weather" may determine an entity type of "Date" and an entity value of "today."

In at least some embodiments, the intents identifiable by the NLU component 160 may be linked to one or more grammar frameworks with entity types to be populated with entity values. Each entity type of a grammar framework corresponds to a portion of ASR output data or text data that the NLU component 160 believes corresponds to an entity value. For example, a grammar framework corresponding to a <PlayMusic> intent may correspond to sentence structures such as "Play {Artist Name}," "Play {Album Name}," "Play {Song name}," "Play {Song name} by {Artist Name}," etc.

For example, the NLU component 160 may perform NER processing to identify words in ASR output data or text data as subject, object, verb, preposition, etc. based on grammar rules and/or models. Then, the NLU component 160 may perform IC processing using the identified verb to identify an intent. Thereafter, the NLU component 160 may again perform NER processing to determine a grammar model associated with the identified intent. For example, a grammar model for a <PlayMusic> intent may specify a list of entity types applicable to play the identified "object" and any object modifier (e.g., a prepositional phrase), such as {Artist Name}, {Album Name}, {Song name}, etc. The NER processing may then involve searching corresponding fields in a lexicon, attempting to match words and phrases in the ASR output data that NER processing previously tagged as a grammatical object or object modifier with those identified in the lexicon.

NER processing may include semantic tagging, which is the labeling of a word or combination of words according to their type/semantic meaning. NER processing may include parsing ASR output data or text data using heuristic grammar rules, or a model may be constructed using techniques such as hidden Markov models, maximum entropy models, log linear models, conditional random fields (CRFs), and the like. For example, NER processing with respect to a music skill may include parsing and tagging ASR output data or text data corresponding to "play mother's little helper by the rolling stones" as {Verb}: "Play," {Object}: "mother's little helper," {Object Preposition}: "by," and {Object Modifier}: "the rolling stones." The NER processing may identify "Play" as a verb based on a word database associated with the music skill, which IC processing determines corresponds to a <PlayMusic> intent.

The NLU component 160 may generate NLU output data including one or more NLU hypotheses, with each NLU hypothesis including an intent and optionally one or more entity types and corresponding entity values. In some embodiments, the NLU component 160 may perform IC processing and NER processing with respect to different skills. One skill may support the same or different intents than another skill. Thus, the NLU output data may include multiple NLU hypotheses, with each NLU hypothesis corresponding to IC processing and NER processing performed on the ASR output or text data with respect to a different skill.

As described above, the system 120 may perform speech processing using two different components (e.g., the ASR component 150 and the NLU component 160). In at least some embodiments, the system 120 may implement a spoken language understanding (SLU) component configured to process audio data 711 to determine NLU output data.

The SLU component may be equivalent to a combination of the ASR component 150 and the NLU component 160. Yet, the SLU component may process audio data 711 and directly determine the NLU output data, without an intermediate step of generating ASR output data. As such, the SLU component may take audio data 711 representing a spoken natural language input and attempt to make a semantic interpretation of the spoken natural language input. That is, the SLU component may determine a meaning associated with the spoken natural language input and then implement that meaning. For example, the SLU component may interpret audio data 711 representing a spoken natural language input in order to derive a desired action. The SLU component may output a most likely NLU hypothesis, or multiple NLU hypotheses associated with respective confidence or other scores (such as probability scores, etc.).

The system 120 may include one or more skill components 190 and/or may communicate with one or more skill systems 125. A "skill" may refer to software, that may be placed on a machine or a virtual machine (e.g., software that may be launched in a virtual instance when called), configured to process NLU output data and perform one or more actions in response thereto. For example, for NLU output data including a <PlayMusic> intent, an "artist" entity type, and an artist name as an entity value, a music skill may be called to output music sung by the indicated artist. For further example, for NLU output data including a <TurnOn> intent, a "device" entity type, and an entity value of "lights," a smart home skill may be called to cause one or more "smart" lights to operate in an "on" state. In another example, for NLU output data including an <OutputWeather> intent, a "location" entity type, and an entity value corresponding to a geographic location of the device 110, a weather skill may be called to output weather information for the geographic location. For further example, for NLU output data including a <BookRide> intent, a taxi skill may be called to book a requested ride. In another example, for NLU output data including a <BuyPizza> intent, a restaurant skill may be called to place an order for a pizza.

A skill component 190 may operate in conjunction between the system 120 and other devices, such as the device 110, a restaurant electronic ordering system, a taxi electronic booking system, etc. in order to complete certain functions. Inputs to a skill component 190 may come from speech processing interactions or through other interactions or input sources.

A skill component 190 may be associated with a domain, a non-limiting list of which includes a smart home domain, a music domain, a video domain, a weather domain, a communications domain, a flash briefing domain, a shopping domain, and a custom domain.

The system 120 may include a TTS component 180 that generates audio data including synthesized speech. The data input to the TTS component 180 may come from a skill 125, the orchestrator component 130, or another component of the system 120.

In one method of synthesis called unit selection, the TTS component 180 matches input data against a database of recorded speech. The TTS component 180 selects matching units of recorded speech and concatenates the units together to form audio data. In another method of synthesis called parametric synthesis, the TTS component 180 varies parameters such as frequency, volume, and noise to determine audio data including an artificial speech waveform. Parametric synthesis uses a computerized voice generator, sometimes called a vocoder.

The system 120 may include a user recognition component 195. The user recognition component 195 may recognize one or more users using various data. The user recognition component 195 may take as input the audio data 711. The user recognition component 195 may perform user recognition by comparing speech characteristics, in the audio data 711, to stored speech characteristics of users. The user recognition component 195 may additionally or alternatively perform user recognition by comparing biometric data (e.g., fingerprint data, iris data, retina data, etc.), received by the system 120 in correlation with a natural language input, to stored biometric data of users. The user recognition component 195 may additionally or alternatively perform user recognition by comparing image data (e.g., including a representation of at least a feature of a user), received by the system 120 in correlation with a natural language input, with stored image data including representations of features of different users. The user recognition component 195 may perform other or additional user recognition processes, including those known in the art. For a particular natural language input, the user recognition component 195 may perform processing with respect to stored data of users associated with the device 110 that received the natural language input.

The user recognition component 195 determines whether a natural language input originated from a particular user. For example, the user recognition component 195 may determine a first value representing a likelihood that a natural language input originated from a first user, a second value representing a likelihood that the natural language input originated from a second user, etc. The user recognition component 195 may also determine an overall confidence regarding the accuracy of user recognition processing.

The user recognition component 195 may output a single user identifier corresponding to the most likely user that originated the natural language input. Alternatively, the user recognition component 195 may output multiple user identifiers (e.g., in the form of an N-best list) with respective values representing likelihoods of respective users originating the natural language input. The output of the user recognition component 195 may be used to inform NLU processing, processing performed by a skill system 125, as well as processing performed by other components of the system 120 and/or other systems.

The system 120 may include profile storage 170. The profile storage 170 may include a variety of data related to individual users, groups of users, devices, etc. that interact with the system 120. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; skill enablement data; and/or other data.

The profile storage 170 may include one or more user profiles. Each user profile may be associated with a different user identifier. Each user profile may include various user identifying data (e.g., name, gender, address, language(s), etc.). Each user profile may also include preferences of the user. Each user profile may include one or more device identifiers, each representing a respective device registered to the user. Each user profile may include skill identifiers of skills 125 that the user has enabled. When a user enables a skill 125, the user is providing the system 120 with permission to allow the skill 125 to execute with respect to the user's natural language inputs. If a user does not enable a skill 125, the system 120 may not execute the skill 125 with respect to the user's natural language inputs.

The profile storage 170 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may be associated with (or include) one or more device profiles corresponding to one or more devices associated with the group profile.

The profile storage 170 may include one or more device profiles. Each device profile may be associated with a different device identifier. A device profile may include various device identifying data, input/output characteristics, networking characteristics, etc. A device profile may also include one or more user identifiers, corresponding to one or more user profiles associated with the device profile. For example, a household device's profile may include the user identifiers of users of the household.

Figure 7:
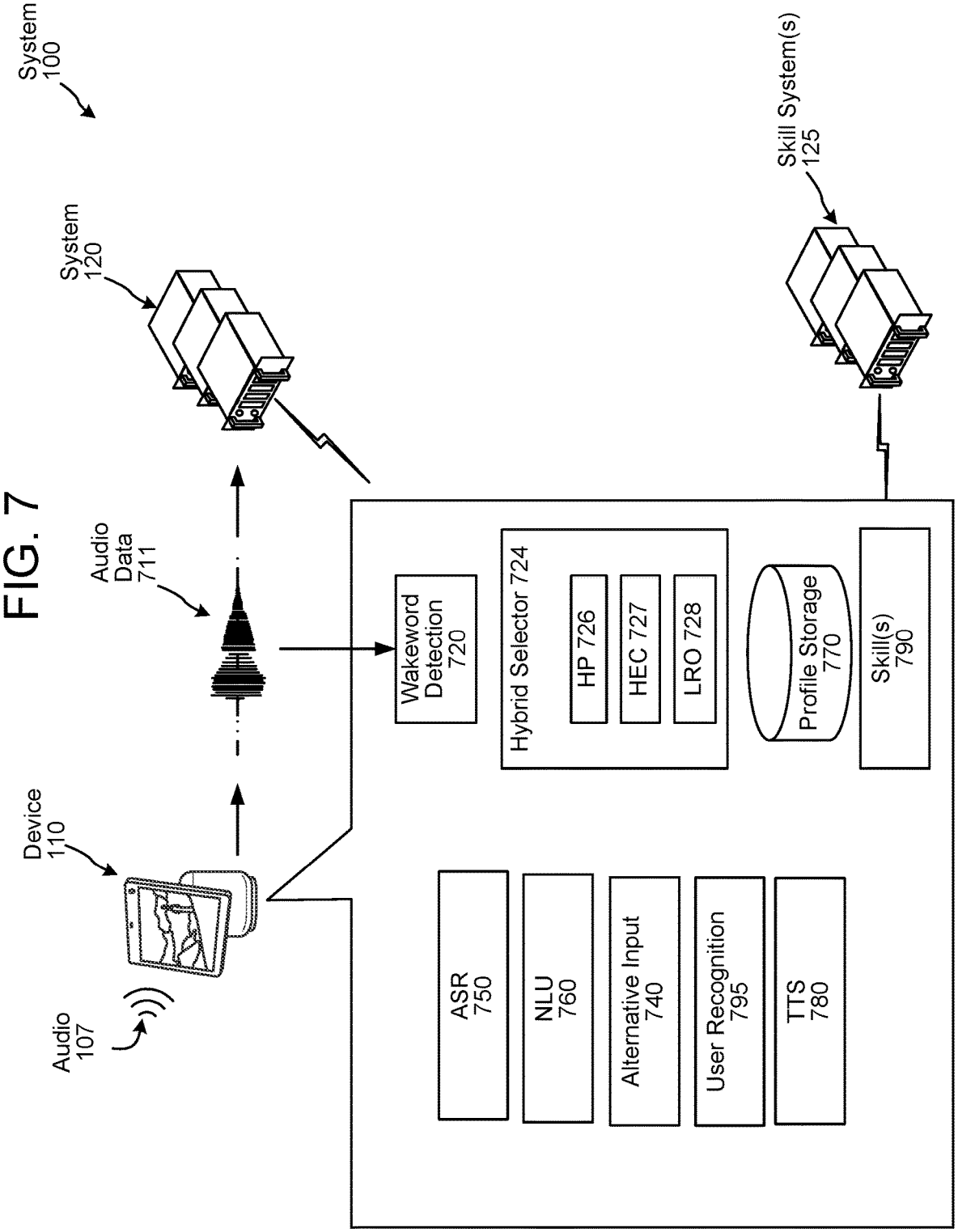
FIG. 7 is a conceptual diagram illustrating components that may be included in a device, according to embodiments of the present disclosure.

The foregoing describes illustrative components and processing of the system 120. The following describes illustrative components and processing of the device 110. As illustrated in FIG. 7, in at least some embodiments the system 120 may receive audio data 711 from the device 110, to recognize speech corresponding to a spoken natural language in the received audio data 711, and to perform functions in response to the recognized speech. In at least some embodiments, these functions involve sending directives (e.g., commands), from the system 120 to the device 110 to cause the device 110 to perform an action, such as output synthesized speech (responsive to the spoken natural language input) via a loudspeaker(s), and/or control one or more secondary devices by sending control commands to the one or more secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output synthesized speech via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It will be appreciated that the system 120 may be configured to provide other functions in addition to those discussed herein, such as, without limitation, providing step-by-step directions for navigating from an origin location to a destination location, conducting an electronic commerce transaction on behalf of the user 105 as part of a shopping function, establishing a communication session (e.g., an audio or video call) between the user 105 and another user, and so on.

The device 110 may include a wakeword detection component 720 configured to detect a wakeword (e.g., "Alexa") that indicates to the device 110 that the audio data 711 is to be processed for determining NLU output data. In at least some embodiments, a hybrid selector 724, of the device 110, may send the audio data 711 to the wakeword detection component 720. If the wakeword detection component 720 detects a wakeword in the audio data 711, the wakeword detection component 720 may send an indication of such detection to the hybrid selector 724. In response to receiving the indication, the hybrid selector 724 may send the audio data 711 to the system 120 and/or an on-device ASR component 750. The wakeword detection component 720 may also send an indication, to the hybrid selector 724, representing a wakeword was not detected. In response to receiving such an indication, the hybrid selector 724 may refrain from sending the audio data 711 to the system 120, and may prevent the on-device ASR component 750 from processing the audio data 711. In this situation, the audio data 711 can be discarded.

The device 110 may conduct its own speech processing using on-device language processing components (such as an on-device SLU component, an on-device ASR component 750, and/or an on-device NLU component 760) similar to the manner discussed above with respect to the speech processing system-implemented ASR component 150, and NLU component 160. The device 110 may also internally include, or otherwise have access to, other components such as one or more skills 190, a user recognition component 795 (configured to process in a similar manner to the speech processing system-implemented user recognition component 195), profile storage 770 (configured to store similar profile data to the speech processing system-implemented profile storage 170), and other components. In at least some embodiments, the on-device profile storage 770 may only store profile data for a user or group of users specifically associated with the device 110.

The device 110 may also include an alternative input component 740 that may be configured to perform operations similar to the alternative input component 140, and may be personalized for the user 105. The device 110 may include an entity expansion knowledge base (storing data similar to the entity expansion knowledge base 240) that is personalized for the user 105.

In at least some embodiments, the on-device language processing components may not have the same capabilities as the language processing components implemented by the system 120. For example, the on-device language processing components may be configured to handle only a subset of the natural language inputs that may be handled by the speech processing system-implemented language processing components. For example, such subset of natural language inputs may correspond to local-type natural language inputs, such as those controlling devices or components associated with a user's home. In such circumstances the on-device language processing components may be able to more quickly interpret and respond to a local-type natural language input, for example, than processing that involves the system 120. If the device 110 attempts to process a natural language input for which the on-device language processing components are not necessarily best suited, the NLU output data, determined by the on-device components, may have a low confidence or other metric indicating that the processing by the on-device language processing components may not be as accurate as the processing done by the system 120.

The hybrid selector 724, of the device 110, may include a hybrid proxy (HP) 726 configured to proxy traffic to/from the system 120. For example, the HP 726 may be configured to send messages to/from a hybrid execution controller (HEC) 727 of the hybrid selector 724. For example, command/directive data received from the system 120 can be sent to the HEC 727 using the HP 726. The HP 726 may also be configured to allow the audio data 711 to pass to the system 120 while also receiving (e.g., intercepting) this audio data 711 and sending the audio data 711 to the HEC 727.

In at least some embodiments, the hybrid selector 724 may further include a local request orchestrator (LRO) 728 configured to notify the on-device ASR component 750 about the availability of the audio data 711, and to otherwise initiate the operations of on-device language processing when the audio data 711 becomes available. In general, the hybrid selector 724 may control execution of on-device language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 120 and chooses to use that remotely-determined directive data.

Thus, when the audio data 711 is received, the HP 726 may allow the audio data 711 to pass through to the system 120 and the HP 726 may also input the audio data 711 to the on-device ASR component 750 by routing the audio data 711 through the HEC 727 of the hybrid selector 724, whereby the LRO 728 notifies the on-device ASR component 750 of the audio data 711. At this point, the hybrid selector 724 may wait for response data from either or both the system 120 and/or the on-device language processing components. However, the disclosure is not limited thereto, and in some examples the hybrid selector 724 may send the audio data 711 only to the on-device ASR component 750 without departing from the disclosure. For example, the device 110 may process the audio data 711 on-device without sending the audio data 711 to the system 120.

The on-device ASR component 750 is configured to receive the audio data 711 from the hybrid selector 724, and to recognize speech in the audio data 711, and the on-device NLU component 7 60 is configured to determine an intent from the recognized speech (an optionally one or more named entities), and to determine how to act on the intent by generating NLU output data that may include directive data (e.g., instructing a component to perform an action). In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

A NLU hypothesis (output by the on-device NLU component 760) may be selected as usable to respond to a natural language input, and local response data may be sent (e.g., local NLU output data, local knowledge base information, internet search results, and/or local directive data) to the hybrid selector 724, such as a "ReadyToExecute" response. The hybrid selector 724 may then determine whether to use directive data from the on-device components to respond to the natural language input, to use directive data received from the system 120, assuming a remote response is even received (e.g., when the device 110 is able to access the system 120 over the network(s) 199), or to determine output data requesting additional information from the user 105.

The device 110 and/or the system 120 may associate a unique identifier with each natural language input. The device 110 may include the unique identifier when sending the audio data 711 to the system 120, and the response data from the system 120 may include the unique identifier to identify to which natural language input the response data corresponds.

In at least some embodiments, the device 110 may include one or more skill components 190. The skill component(s) 190 installed on (or in communication with) the device 110 may include, without limitation, a smart home skill and/or a device control skill configured to control a second device(s), a music skill configured to output music, a navigation skill configured to output directions, a shopping skill configured to conduct an electronic purchase, and/or the like.

One or more of the components described herein may employ a machine learning (ML) model(s). Generally, ML models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognition patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning model requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 8:
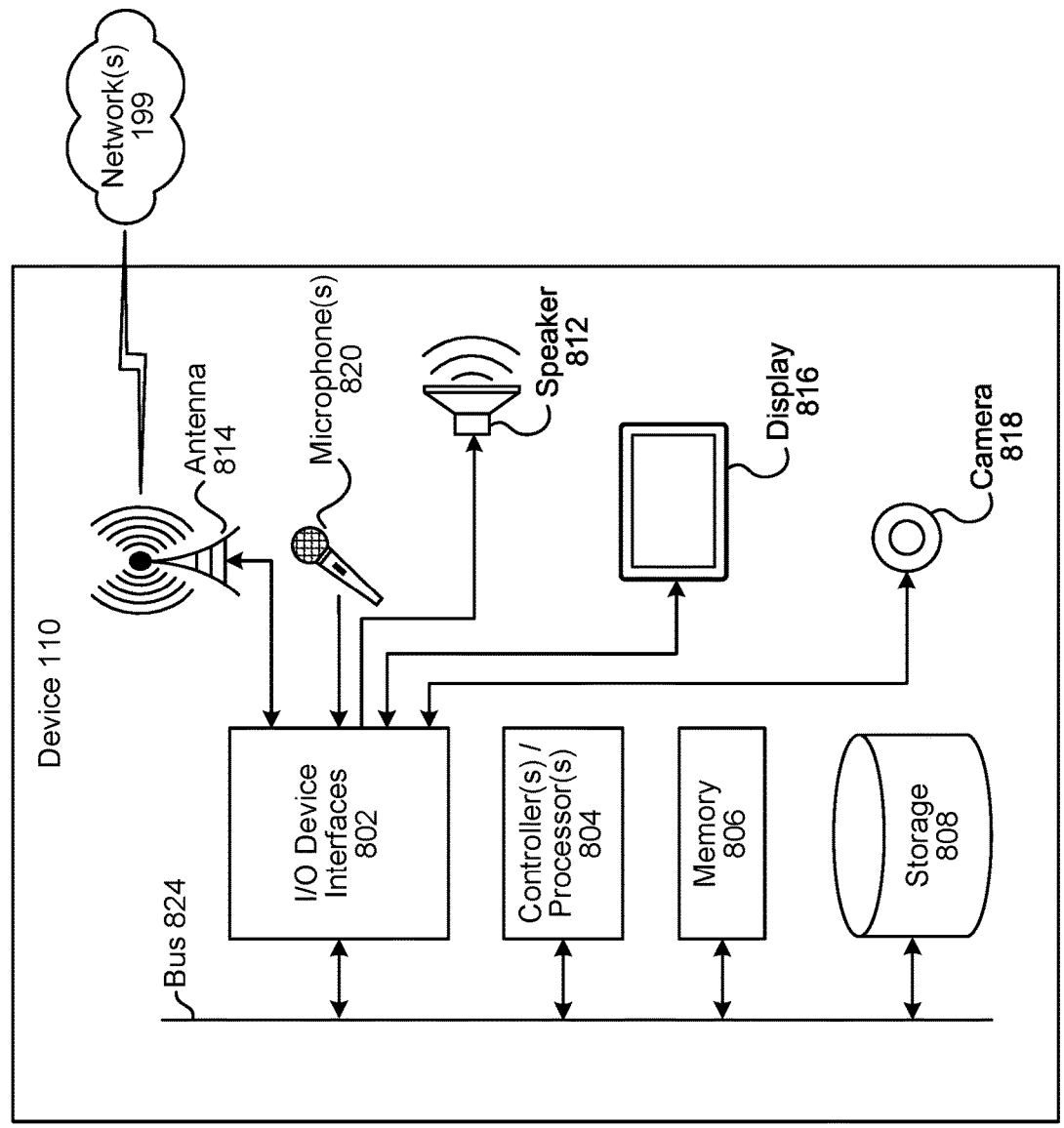
FIG. 8 is a block diagram conceptually illustrating example components of a device, according to embodiments of the present disclosure.
Figure 9:
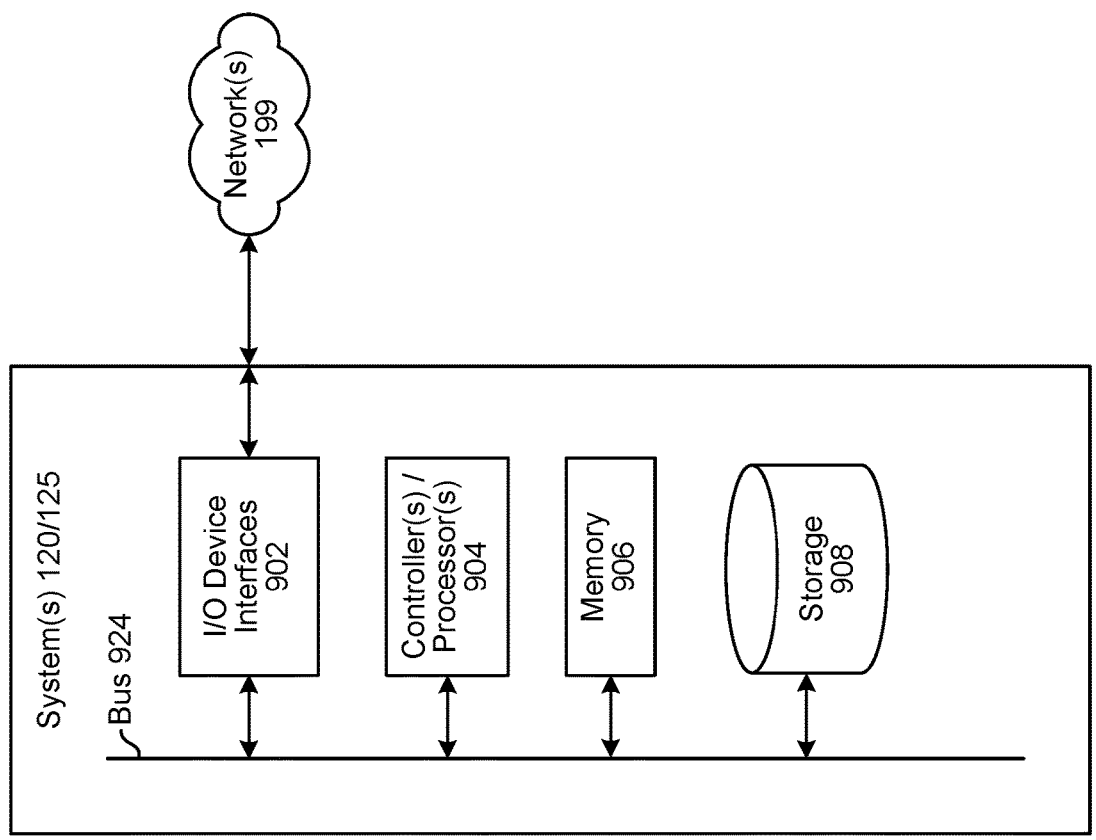
FIG. 9 is a block diagram conceptually illustrating example components of a system, according to embodiments of the present disclosure.

FIG. 8 is a block diagram conceptually illustrating a device 110 of the system 100. FIG. 9 is a block diagram conceptually illustrating example components of a system, such as the system 120, and the skill(s) system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system (120/125) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the system 100 of the present disclosure, such as, one or more systems 120 and/or one or more skills 125. In operation, each of these systems may include computer-readable and computer-executable instructions that reside on the respective device (120/125), as will be discussed further below.

Each of these devices (110/120/125) may include one or more controllers/processors (804/904), which may each include a central processing unit (CPU) for processing data and computer-readable instructions, and a memory (806/906) for storing data and instructions of the respective device. The memories (806/906) may individually include volatile random access memory (RAM), non-volatile read only memory (ROM), non-volatile magnetoresistive memory (MRAM), and/or other types of memory. Each device (110/120/125) may also include a data storage component (808/908) for storing data and controller/processor-executable instructions. Each data storage component (808/908) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (802/902).

Computer instructions for operating each device (110/120/125) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device (110/120/125) includes input/output device interfaces (802/902). A variety of components may be connected through the input/output device interfaces (802/902), as will be discussed further below. Additionally, each device (110/120/125) may include an address/data bus (824/924) for conveying data among components of the respective device. Each component within a device (110/120/125) may also be directly connected to other components in addition to (or instead of) being connected to other components across the bus (824/924).

Referring to FIG. 8, the device 110 may include input/output device interfaces 802 that connect to a variety of components such as an audio output component such as a speaker 812, a wired headset or a wireless headset (not illustrated), or other component capable of outputting audio. The device 110 may also include an audio capture component. The audio capture component may be, for example, a microphone 820 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 816 for displaying content. The device 110 may further include a camera 818.

Via antenna(s) 814, the input/output device interfaces 802 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (802/902) may also include communication components that allow data to be exchanged between devices such as different physical servers in a collection of servers or other components.

The components of the device 110, the system 120, and/or skill system(s) 125 may include their own dedicated processors, memory, and/or storage. Alternatively, one or more of the components of the device 110, the system 120, and/or skill system(s) 125 may utilize the I/O interfaces (802/902), processor(s) (804/904), memory (806/906), and/or storage (808/908) of the device 110, the system 120, and/or skill system(s) 125, respectively.

As noted above, multiple devices may be employed in a single system. In such a multi-device system, each of the devices may include different components for performing different aspects of the system's processing. The multiple devices may include overlapping components. The components of the device 110, the system 120, and the skill system(s) 125, as described herein, are illustrative, and may be located as a stand-alone device or may be included, in whole or in part, as a component of a larger device or system.

Figure 10:
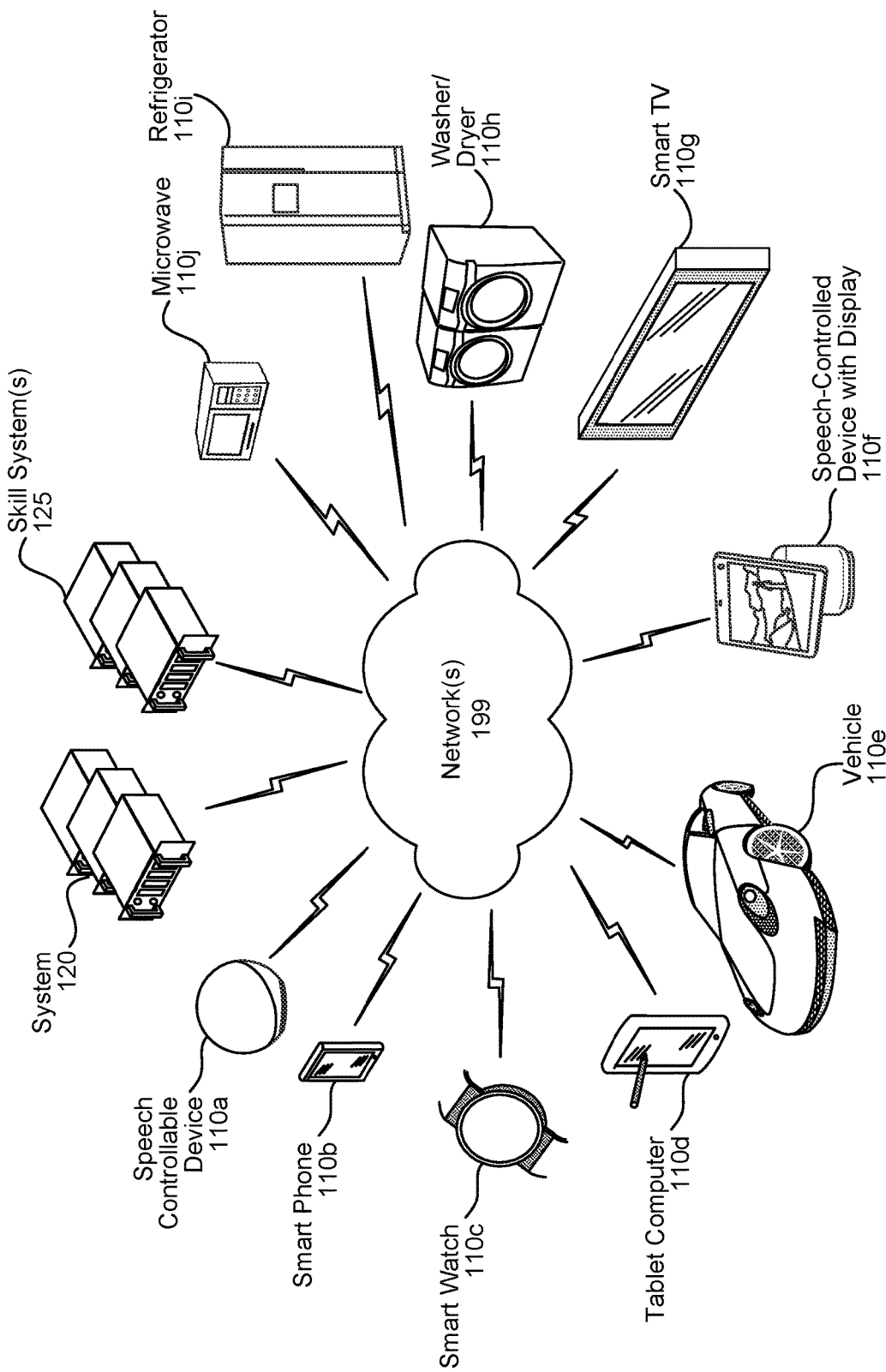
FIG. 10 illustrates an example of a computer network for use with the overall system, according to embodiments of the present disclosure.

As illustrated in FIG. 10, multiple devices (110a-110j, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-controllable device 110a, a smart phone 110b, a smart watch 110c, a tablet computer 110d, a vehicle 110e, a speech-controllable display device 110f, a smart television 110g, a washer/dryer 110h, a refrigerator 110i, and/or a microwave 110j may be connected to the network(s) 199 through a wireless service provider, over a Wi-Fi or cellular network connection, or the like. Other devices are included as network-connected support devices, such as the system 120, the skill 125, and/or others. The support devices may connect to the network(s) 199 through a wired connection or wireless connection.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving audio data corresponding to a spoken input;
determining automatic speech recognition (ASR) data using the audio data;
determining natural language understanding (NLU) data using the ASR data, the NLU data including first entity data representing a first entity;
determining, using a knowledge base, a plurality of entities using the first entity data, wherein the knowledge base includes connections between at least the first entity and a second entity based on inclusion in at least a first pair including a first past user input and a first past system response associated with the first past user input;
determining, using a classifier, that the first entity corresponds to a first level, the classifier being configured using at least a second pair including a first user input and a first alternative input representation, wherein the classifier is configured to categorize the first entity to one of:
the first level representing that the first entity is included in the spoken input,
a second level representing that the first entity is included in a second alternative input representation corresponding to the spoken input, and
a third level representing that the first entity is included in both the spoken input and the second alternative input representation;
determining, using the classifier, that a second entity of the plurality of entities corresponds to the second level;
determining, using the classifier, that a third entity of the plurality of entities corresponds to the third level;
determining a ranked list of entities based on classification of entities by the classifier, wherein the ranked list of entities includes the third entity, corresponding to the third level, ranked higher than the second entity based on the second entity corresponding to the second level, and wherein the ranked list of entities excludes the first entity based on the first entity corresponding to the first level;
determining, using the third entity, a third alternative input representation corresponding to the spoken input; and
determining, using the third alternative input representation, output data responsive to the spoken input.

2. The computer-implemented method of claim 1, further comprising:
receiving first data representing the first past user input and the first past system response;
determining the first entity, the second entity and the third entity are included in the first data;
determining the first entity corresponds to a first score based on the first entity being included in the first past user input;
determining the second entity corresponds to a second score based on the second entity being included in the first past system response;
determining the third entity corresponds to a third score based on the third entity being included in both the first past user input and the first past system response;
storing, in the knowledge base, a first node representing the first entity, a second node representing the second entity, and a third node representing the third entity;
storing, in the knowledge base, a first association between the first node and the second node, the first association corresponding to a fourth score based on the first score and the second score; and
storing, in the knowledge base, a second association between the first node and the third node, the second association corresponding to a fifth score based on the first score and the third score,
wherein determining, using the knowledge base, the plurality of entities related to the first entity comprises determining at least the second entity and the third entity based on the first association and the second association.

3. The computer-implemented method of claim 1, further comprising:
determining first data representing the spoken input, the first entity, and a first entity type corresponding to the first entity;
determining first encoded data corresponding to the first data;
determining second data representing the spoken input, the second entity, and a second entity type corresponding to the second entity;
determining second encoded data corresponding to the second data;
determining third data representing the spoken input, the third entity, and a third entity type corresponding to the third entity;
determining third encoded data corresponding to the third data;
processing, using a first cross attention component, the first encoded data, the second encoded data and the third encoded data to determine first embedding data corresponding to the first entity, second embedding data corresponding to the second entity, and third embedding data corresponding to the third entity;
processing, using the classifier, the first embedding data to determine that the first entity corresponds to the first level;
processing, using the classifier, the second embedding data to determine that the second entity corresponds to the second level; and processing, using the classifier, the third embedding data to determine that the third entity corresponds to the third level.

4. The computer-implemented method of claim 1, wherein the NLU data includes a fourth entity, and the method further comprises:
determining, using the knowledge base, at least a fifth entity associated with the fourth entity;
determining fourth data representing the spoken input, the fourth entity, and a fourth entity type corresponding to the fourth entity;
determining fourth encoded data corresponding to the fourth data;
determining fifth data representing the spoken input, the fifth entity, and a fifth entity type corresponding to the fifth entity;
determining fifth encoded data corresponding to the fifth data;
processing, using a first cross attention component, the fourth encoded data and the fifth encoded data to determine fourth embedding data corresponding to the fourth entity and fifth embedding data corresponding to the fifth entity;
processing, using a second cross attention component, first embedding data corresponding to the first entity, second embedding data corresponding to the second entity, third embedding data corresponding to the third entity, the fourth embedding data, and the fifth embedding data to determine sixth embedding data corresponding to the first entity, seventh embedding data corresponding to the second entity, eighth embedding data corresponding to the third entity, ninth embedding data corresponding to the fourth entity and tenth embedding data corresponding to the fifth entity;
processing, using the classifier, the sixth embedding data to determine that the first entity corresponds to the first level;
processing, using the classifier, the seventh embedding data to determine that the second entity corresponds to the second level;
processing, using the classifier, the eighth embedding data to determine that the third entity corresponds to the third level;
processing, using the classifier, the ninth embedding data to determine that the fourth entity corresponds to the first level; and
processing, using the classifier, the tenth embedding data to determine that the fifth entity corresponds to the third level.

5. A computer-implemented method comprising:
receiving first input data corresponding to a first user input including a spoken input;
determining natural language understanding (NLU) data including a first entity and a second entity corresponding to the first input data;
determining, using a knowledge graph, a third entity associated with the first entity, wherein the knowledge graph includes connections between at least the first entity and the third entity based on inclusion in at least a first pair of a first past user input and a first past system response associated with the first past user input;
determining, using the knowledge graph, a fourth entity associated with the second entity;
determining that the first entity is included in the first user input, the determining being based at least in part on at least a second pair of a second user input and a first alternative input representation corresponding to the second user input;
determining first data indicating that the third entity is included in both the first user input and a second alternative input representation corresponding to the first user input;
determining second data indicating that the second entity is included in both the first user input and the second alternative input representation;
determining third data indicating that the fourth entity is included in the second alternative input representation;
determining, based on the first data, second data and third data, a ranked list of entities of the first entity, the second entity, the third entity, and the fourth entity;
selecting the third entity instead of the first entity based at least in part on the third entity being included in both the first user input and the second alternative input representation;
determining, using at least the third entity, a third alternative input representation corresponding to the first user input; and
determining, using the third alternative input representation, output data responsive to the first user input.

6. The computer-implemented method of claim 5, further comprising:
receiving first data representing the first past user input and the first past system response;
determining the first entity, the second entity and a third entity are included in the first data;
determining the first entity is included in the first past user input;
determining the second entity is included in the first past system response;
determining the third entity is included in both the first past user input and the first past system response;
storing, in the knowledge graph, a first node representing the first entity, a second node representing the second entity, and a third node representing the third entity;
storing, in the knowledge graph, a first association between the first node and the second node, the first association corresponding to a first score based on the first entity being included in the first past user input and the second entity being included in the first past system response; and
storing, in the knowledge graph, a second association between the first node and the third node, the second association corresponding to a second score based on the first entity being included in the first past user input and the third entity being include in both the first past user input and the first past system response,
wherein determining, using the knowledge graph, the second entity associated with the first entity comprises determining the second entity based on the first association.

7. The computer-implemented method of claim 5, further comprising:
determining first data representing the first user input, the first entity, and a first entity type corresponding to the first entity;
determining first encoded data corresponding to the first data;
determining second data representing the first user input, the second entity, and a second entity type corresponding to the second entity;
determining second encoded data corresponding to the second data;

processing, using a cross attention component, the first encoded data and the second encoded data to determine first embedding data corresponding to the first entity and second embedding data corresponding to the second entity;

processing the first embedding data to determine that the first entity is included in the first user input; and processing the second embedding data to determine that the second entity is included in both the first user input and the second alternative input representation.

8. The computer-implemented method of claim 5, further comprising:

determining, using the knowledge graph, a third entity associated with the first entity;

determining that the third entity is included in the second alternative input representation;

determining a list of entities based on classification of entities by a trained classifier model, wherein the list of entities includes the second entity based on the second entity being included in both the first user input and the second alternative input representation, wherein the list includes the third entity based on the third entity being included in the second alternative input representation;

determining, using the third entity, a fourth alternative input representation corresponding to the first user input;

storing, in a data storage, first data associating the first user input and the third alternative input representation, the data storage to be used to determine alternative input representations for subsequently received user inputs; and storing, in the data storage, second data associating the first user input and the fourth alternative input representation.

9. The computer-implemented method of claim 5, further comprising:

determining a third entity corresponding to the first input data;

determining, using the knowledge graph, a fourth entity associated with the third entity;

processing, using a first cross attention component, the first entity and the second entity to determine first embedding data corresponding to the first entity and second embedding data corresponding to the second entity;

processing, using the first cross attention component, the third entity and the fourth entity to determine third embedding data corresponding to the third entity and fourth embedding data corresponding to the fourth entity;

processing, using a second cross attention component, the first embedding data, the second embedding data, the third embedding data and the fourth embedding data to determine fifth embedding data corresponding to the first entity, sixth embedding data corresponding to the second entity, seventh embedding data corresponding to the third entity and eighth embedding data corresponding to the fourth entity;

processing the fifth embedding data to determine that the first entity is included in the first user input;

processing the sixth embedding data to determine that the second entity is included in both the first user input and the second alternative input representation;

processing the seventh embedding data to determine that the third entity is included in both the first user input and the second alternative input representation; and processing the eighth embedding data to determine that the fourth entity is included in the second alternative input representation.

10. The computer-implemented method of claim 5, further comprising:

determining a third entity corresponding to the first input data;

determining that the third entity is included in both the first user input and a fourth alternative input representation corresponding to the first user input; and based at least in part on the second entity being included in both the first user input and the second alternative input representation and the third entity being included in both the first user input and the fourth alternative input representation, determining a fifth alternative input representation corresponding to the first user input, wherein the fifth alternative input representation includes the second entity and the third entity.

11. The computer-implemented method of claim 5, further comprising:

receiving first data representing the second user input and the first alternative input representation corresponding to the second user input, the first data indicating that the first entity is included in the second user input and the second entity is included in the first alternative input representation;

receiving second data representing a third user input and a fourth alternative input representation corresponding to the third user input, the second data indicating that a third entity is included in the third user input and a fourth entity is included in the fourth alternative input representation; and processing at least the first data and the second data to configure a trained classifier model to categorize entities based on potentially being included in user inputs and alternative input representations.

12. A system comprising:

at least one processor; and at least one memory including instructions that, when executed by the at least one processor, cause the system to:

receive first input data corresponding to a first user input including a spoken input;

determine natural language understanding (NLU) data including a first entity and a second entity corresponding to the first input data;

determine, using a knowledge graph, a third entity associated with the first entity, wherein the knowledge graph includes connections between at least the first entity and the third entity based on inclusion in at least a first pair of a first past user input and a first past system response associated with the first past user input;

determine, using the knowledge graph, a fourth entity associated with the second entity;

determine that the first entity is included in the first user input, wherein such a determination is based at least in part on a second pair of a second user input and a first alternative input representation corresponding to the second user input;

determine, that the third entity is included in both the first user input and a second alternative input representation corresponding to the first user input;

determine that the second entity is included in both the first user input and a third alternative input representation corresponding to the first user input; and based at least in part on the third entity being included in both the first user input and the second alternative input representation and the second entity being included in both the first user input and the third alternative input representation, determining a fourth alternative input representation corresponding to the first user input, wherein the fourth alternative input representation includes the second entity and the third entity;

determine, using the fourth alternative input representation, output data responsive to the first user input.

13. The system of claim 12, wherein the at least one memory includes further instructions that, when executed by the at least one processor, further cause the system to:
receive first data representing the first past user input and the first past system response;
determine the first entity, the second entity and a third entity are represented in the first data;
determine the first entity is included in the first past user input;
determine the second entity is included in the first past system response;
determine the third entity is included in both the first past user input and the first past system response;
store, in the knowledge graph, a first node representing the first entity, a second node representing the second entity, and a third node representing the third entity;
store, in the knowledge graph, a first association between the first node and the second node, the first association corresponding to a first score based on the first entity being included in the first past user input and the second entity being included in the first past system response;
store, in the knowledge graph, a second association between the first node and the third node, the second association corresponding to a second score based on the first entity being included in the first past user input and the third entity being include in both the first past user input and the first past system response; and
determine, using the knowledge graph, the second entity based on the first association.

14. The system of claim 12, wherein the at least one memory includes further instructions that, when executed by the at least one processor, further cause the system to:
determine first data representing the first user input, the first entity, and a first entity type corresponding to the first entity;
determine first encoded data corresponding to the first data;
determine second data representing the first user input, the second entity, and a second entity type corresponding to the second entity;
determine second encoded data corresponding to the second data;
process, using a cross attention component, the first encoded data and the second encoded data to determine first embedding data corresponding to the first entity and second embedding data corresponding to the second entity;
process the first embedding data to determine that the first entity is included in the first user input; and
process the second embedding data to determine that the second entity is included in both the first user input and the second alternative input representation.

15. The system of claim 12, wherein the at least one memory includes further instructions that, when executed by the at least one processor, further cause the system to:

determine, using the knowledge graph, a third entity associated with the first entity;
determine that the third entity is included in the second alternative input representation;
determine a list of entities based on classification of entities by a trained classifier model, wherein the list of entities includes the second entity based on the second entity being included in both the first user input and the second alternative input representation, wherein the list includes the third entity based on the third entity being included in the second alternative input representation;
determine, using the third entity, a fourth alternative input representation corresponding to the first user input;
store, in a data storage, first data associating the first user input and the third alternative input representation, the data storage to be used to determine alternative input representations for subsequently received user inputs; and
store, in the data storage, second data associating the first user input and the fourth alternative input representation.

16. The system of claim 12, wherein the at least one memory includes further instructions that, when executed by the at least one processor, further cause the system to:
determine a third entity corresponding to the first input data;
determine, using the knowledge graph, a fourth entity associated with the third entity;
determine that the third entity is included in both the first user input and the second alternative input representation;
determine that the fourth entity is included in the second alternative input representation; and
determine a ranked list of entities based on classification of the second entity, the third entity, the fourth entity, and the first entity.

17. The system of claim 12, wherein the at least one memory includes further instructions that, when executed by the at least one processor, further cause the system to:
determine a third entity corresponding to the first input data;
determine, using the knowledge graph, a fourth entity associated with the third entity;
process, using a first cross attention component, the first entity and the second entity to determine first embedding data corresponding to the first entity and second embedding data corresponding to the second entity;
process, using the first cross attention component, the third entity and the fourth entity to determine third embedding data corresponding to the third entity and fourth embedding data corresponding to the fourth entity;
process, using a second cross attention component, the first embedding data, the second embedding data, the third embedding data and the fourth embedding data to determine fifth embedding data corresponding to the first entity, sixth embedding data corresponding to the second entity, seventh embedding data corresponding to the third entity and eighth embedding data corresponding to the fourth entity;
process the fifth embedding data to determine that the first entity is included in the first user input;
process the sixth embedding data to determine that the second entity is included in both the first user input and the second alternative input representation;

process the seventh embedding data to determine that the third entity is included in both the first user input and the second alternative input representation; and process the eighth embedding data to determine that the fourth entity is included in the second alternative input representation.

18. The system of claim 12, wherein the at least one memory includes further instructions that, when executed by the at least one processor, further cause the system to:

receive first data representing the second user input and the first alternative input representation corresponding to the second user input, the first data indicating that the first entity is included in the second user input and the second entity is included in the first alternative input representation;

receive second data representing a third user input and a fourth alternative input representation corresponding to the third user input, the second data indicating that a third entity is included in the third user input and a fourth entity is included in the fourth alternative input representation; and process at least the first data and the second data to configure a trained classifier model to categorize entities based on potentially being included in user inputs and alternative input representations.

* * * * *